US006773465B1

United States Patent
Murai et al.

(10) Patent No.: US 6,773,465 B1
(45) Date of Patent: Aug. 10, 2004

(54) OPTICAL ELEMENT

(75) Inventors: Sachio Murai, Aichi (JP); Naoki Uchida, Nishio (JP); Takehiro Shimizu, Gamagori (JP); Tomonori Kubo, Gamagori (JP); Satoshi Yamada, Okazaki (JP)

(73) Assignee: Itoh Optical Industrial Co., Ltd., Aichi (JP)

( * ) Notice: Subject to any disclaimer, the term of this patent is extended or adjusted under 35 U.S.C. 154(b) by 0 days.

(21) Appl. No.: 10/009,513

(22) PCT Filed: May 18, 2000

(86) PCT No.: PCT/JP00/03180

§ 371 (c)(1),
(2), (4) Date: Dec. 11, 2001

(87) PCT Pub. No.: WO01/88048

PCT Pub. Date: Nov. 22, 2001

(51) Int. Cl.$^7$ ................................................. D06P 1/00
(52) U.S. Cl. ......................... 8/471; 428/447; 428/480; 524/430
(58) Field of Search ................................ 428/447, 480; 524/430; 523/505; 8/471

(56) References Cited

U.S. PATENT DOCUMENTS

| | | | | |
|---|---|---|---|---|
| 5,234,986 A | * | 8/1993 | McBride | ..................... 524/505 |
| 5,383,166 A | | 1/1995 | Gallay | |
| 5,704,854 A | * | 1/1998 | Higuchi et al. | ............. 473/373 |
| 5,929,165 A | | 7/1999 | Tasaka et al. | |
| 6,242,560 B1 | * | 6/2001 | Gyobu et al. | ............... 528/272 |

FOREIGN PATENT DOCUMENTS

| | | | |
|---|---|---|---|
| EP | 0 791 620 A2 | 8/1997 | |
| EP | 0 791 620 A3 | 10/1997 | |
| JP | 59045349 A | * 3/1984 | ........... C08L/67/02 |
| JP | 62039680 A | * 2/1987 | .............. C09J/3/16 |
| JP | 6011601 | 1/1994 | |
| JP | 6337379 | 12/1994 | |
| JP | 9176520 | 7/1997 | |
| JP | 10123301 | 5/1998 | |
| JP | 11174205 | 7/1999 | |
| JP | 11193355 | 7/1999 | |
| JP | 3022555 | 1/2000 | |
| JP | 2000144048 | 5/2000 | |

OTHER PUBLICATIONS

Supplementary Partial European Search Report dated Mar. 19, 2003.

* cited by examiner

*Primary Examiner*—Margaret G. Moore
*Assistant Examiner*—Marc S Zimmer
(74) *Attorney, Agent, or Firm*—Rader, Fishman & Grauer PLLC

(57) ABSTRACT

An optical element in which a hard coat layer is formed on an organic glass base material surface via a primer layer. For a primer composition forming a primer layer, whole or the main body of the primer layer formation polymer is made as being ester based TPE. Moreover, a hard coat composition forming a hard coat layer is consisted of a hydrolysate of alkoxysilane in which trialkoxysilane containing monoexpoxy organic group is the main body as a matrix formation ingredient, and the titanium based metal oxide complex particle as being an optical interference control agent, the foregoing titanium based metal oxide complex particle is consisted of $T_1O_2$ as the main body, $SiO_2$ as a major sub-ingredient, and further, $ZrO_2$ and $K_2O$ as a trace sub-ingredient. An optical element of the present invention is capable of suppressing optical interference even if it is a high refractive index base material and the stability of coated film portion is also excellent as well as has a variety of properties comparable to the conventional optical parts.

21 Claims, 1 Drawing Sheet

OPTICAL ELEMENT

TECHNICAL FIELD

The present invention relates to an optical element. More particularly, the present invention relates to a hard coat composition, a primer composition in the surface of the optical element, a surface processing technology such as a reflection prevention film and the like and a dyeing method. The present invention is preferable for an optical part (optical element) of an organic glass base material having particularly a high refractive index.

As used herein, the term "optical element" refers to a concept which includes, but not limited to, original optical elements such as a lens for glasses, a lens for camera, a lens for microscope, a lens for telescope, a lens for binocular, a reflecting mirror, a prism and the like, also includes a filter, a cover for a lighting fitting and the like.

In the following description, a lens for glasses (optical lens) will be mainly exemplified and described, but not limited to this.

BACKGROUND ART

In recent years, as a material of an optical lens, an organic glass has been popular among the people, which is lightly weighted, and excellent at shock resistance, having chromatophilia and easily processed comparing with an inorganic glass. Among these, an organic glass having a high refractive index, which is capable of thinning the thickness of lens (refractive index, around 1.60) has been widely used. However, in general, an organic glass has a lower abrasive resistance (resistance against scraping and damaging) compared with an inorganic glass, therefore, easily scraped and damaged. Hence, in general, a hard coat (silicone-based hardening film coating) is performed on the surface of the organic glass base material (hereinafter, it may be referred to only as "base material"). Furthermore, in a lens for glasses, from the reasons such as the esthetic reason and the like, an inorganic reflection prevention film is often formed by dry plating such as vapor deposition and the like of inorganic substances.

However, as described above, a lens to which both a hard coat and an inorganic reflection prevention film have been provided had a non-conformity of shock resistance being inferior. Hence, in order to enhance the shock resistance, a variety of technical concepts in which between the base material and the hard coat, a primer layer consisted of polyurethane based coating (mainly, urethane base thermoplastic elastomer (hereinafter, referred to as "TPU") is made coating film formation element) is intervened have been proposed.

Then, it is necessary to secure the refractive index similar to the base material in each layer in order to prevent the optical interference of a lens in the case where the above-described hard coat layer and primer layer are laminated on a base material having a high refractive index.

The present inventors have previously proposed a primer composition which prevents the occurrence of optical interference even if the base material has relatively a high refractive index (see Japanese Unexamined Patent Publication No. Hei 6-82694) and a hard coat composition having a high refractive index (see Japanese Patent No. 2577670), and one portion of these has been developed to put to practical use.

However, as a trend in recent years, the fashionability has been considered as a more important factor, as the needs which the thickness of lens edge face has to be thinner are enhanced, a super high refractive organic lens having a higher refractive index (refractive index 1.70) has been commercially available in the optical industry.

Then, it has been found that it is difficult to suppress the light interference in the case where a hard coat composition described in the above-described Japanese Patent No. 2577670 is coated on the above-described lens having a super high refractive index.

Moreover, it has been found that after the long term of usage of lens has been passed, the hard coat layer causes the blackening phenomenon due to the ultraviolet ray to occur and esthetic aspect is damaged. This blackening phenomenon is estimated on the basis of iron oxide in the iron oxide/titanium oxide complex oxide particle which has been used as a hard coat ingredient.

Furthermore, it has been found that the primer composition described in the above-described Japanese Unexamined Patent Publication No. Hei 6-82694 lowers the heat resistance of the base material, and the material is easily non-uniform within the layer, therefore, cloudiness due to the irregular reflection of light is recognized.

On the other hand, the above-described material having a high refractive index is more difficult to dye comparing with a material having a lower refractive index. Therefore, in the immersion dyeing method in which the base material is immersed in an aqueous dye bath (aqueous solution) which uses disperse dye and the like, the problems listed below have been easily occurred.

It is difficult for an immersion dyeing method to perform a dyeing of a uniform and stable coloring to the base material. This is the reason why the dyeing property (dyeing speed and dyeing equilibrium) is easily influenced with the respective ingredient concentration of dye aqueous dispersion liquid (disperse dye, surfactant, dyeing promoter and the like) and variation of dyeing temperature, and further, the kind of an organic glass base material. Moreover, in the case where a higher concentration dyeing (dyeing property) is required, it needs to dye for a long time period. Moreover, since it is the dyeing in the low temperature and the dyeing property is not sufficient, fading in the coloring in the subsequent steps is significant, it is difficult to finish it in the desired coloring.

In order to solve the problem of the above-described immersion dyeing method, for example, a method of heating and transcribing the dye (migration) after the dye is sublimed at gaseous phase and the dyeing layer is formed on the surface of the glass surface (Japanese Unexamined Patent Publication No. Sho 56-159376 and the like), and a method of adhering the transcribed film which has been dyed on the surface of an organic glass base material and heating and transcribing (Japanese Unexamined Patent Publication No. 2000-17586 and the like) have been proposed.

However, in the former method, since the sublimation temperatures are different depending on the dyes, it is difficult to obtain the desired coloring, coloring concentration on and in the base material, and in the latter method, it is difficult to precisely adhere the transcription film on the curved surface and it is difficult to obtain a uniform without coloring variation on and in the base material.

The first object of the present invention is to provide a primer composition in which refractive index can be adjustable without lowering the heat resistance of the base material and the cloudiness due to the irregular reflection of light is slight as well as the similar characteristics (shock resistance, scraping and damaging resistance and the like) as the conventional primer composition can be conferred and an optic element utilizing the primer composition.

The second object of the present invention is to provide a hard coat composition which is capable of suppressing the optical interference with respect to a base material having a super high refractive index and is excellent at light resistance without damaging the esthetic aspect even if the optic part is used for a long term without occurring the blackening phenomenon due to the ultraviolet and an optical element utilizing the hard coat composition.

The third object of the present invention is to provide an organic glass optic element in which the adhesion with the hard coat layer, the scraping and damaging resistance and the heat resistance are excellent in an optic element having the above-described hard coat layer, and the foregoing organic glass optic element having a reflection prevention film having an excellent reflection prevention effect in the wide range of wavelengths and the foregoing reflection prevention film capable of being well colored in an interference color of green which is generally required for lens for glasses.

The fourth object of the present invention is to provide a composition for dyeing an organic glass capable of stably and well dyeing and further dyeing it to the required coloring and a method of dyeing an organic glass.

DISCLOSURE OF THE INVENTION (1) The first invention achieves the above-described first object with a primer composition of the following constitution and a primer element consisted of the relevant primer composition.

A primer composition of the present invention is characterized in that it is a composition for forming a primer layer between an organic glass and a silicone based hardening coating film, and whole of or the main body of the primer layer forming polymer is a polyester based thermoplastic elastomer (ester based TPE).

It is desirable that the above-described primer composition contains a metal oxide particle as an optical interference control agent (refractive index preparation).

It is desirable that the above-described ester based TPE molar ratio of the hard segment and the soft segment is the former/the latter=30/70–90/10, and the relevant ester base TPE exhibits the characteristics of surfacial hardness (shore hardness D): 35–75 and bend elasticity: 40–800 MPa.

(2) The second invention achieves the above-described second object by an optic element having a hard coat layer consisted of a hard coat composition of the following constitution and the relevant hard coat composition.

A hard coat composition of the present invention is characterized in that hydrolysate of alkoxysilane consisted of trialkoxysilane as the main body containing monoepoxy organic group is made a matrix formation ingredient, and titania based metal oxide complex particle is made optic interference control agent (refractive index preparation), the titania based metal oxide complex particle is made consisted of $TiO_2$ as the main body, $SiO_2$ as the major sub-ingredient, and further, $ZrO_2$ and $K_2O$ as a trace sub-ingredient.

For the above-described titania based metal oxide complex particle, it is desirable that its average particle diameter is made as 1–50 nm, its composition is made as satisfying the respective weight ratio of $SiO_2/TiO_2$=0.1900–0.2100, $ZrO_2/TiO_2$=0.0015–0.023, $K_2O/TiO_2$=0.0012–0.012, and the contents are made as 40–100 weight portions with respect to the total alkoxysilane 100 weight portions.

Moreover, it is desirable that trialkoxysilane containing monoepoxy organic group is consisted of one or more species selected from the group expressed by the following general formula (1):

General Formula (1)

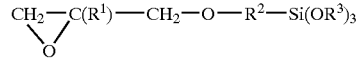

(where $R^1$ represents H or $CH_3$, $R^2$ represents alkylene group having the number of carbon atoms of 1–4. $R^3$ represents alkyl group having the number of carbon atoms of 1–4), or, from the group expressed by the following general formula (2):

General Formula (2)

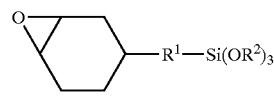

(where $R^1$ represents alkylene group having the number of carbon atoms of 1–4 and $R^2$ represents alkyl group having the number of carbon atoms of 1–4)

Furthermore, it is desirable that as alkoxysilane except for the foregoing trialkoxysilane containing monoepoxy organic group, tetraalkoxysilane indicated by the following general formula (3):

General Formula (3)

is used, and the content of the tetraalkoxysilane is made less than 20 wt % in the total alkoxysilane.

Moreover, it is desirable that it contains an organic metal compound as a hardening agent of the matrix formation ingredient, the relevant organic metal compound(s) of one or more species selected from the group of chelating compounds of Cr (III), Co (III), Fe (III), Zn (II), In (III), Zr (IV), Y (III), Sn, V, Al (III), Ti (II) with which a chelating agent selected from ethylenediamine-tetraacetic acid (EDTA), hexafluoroacetylacetone, trifluoroacetylacetone, acetyl acetone and methyl acetoacetate coordinates are used.

An organic glass base material to which a hard coat composition of the second invention is applied is preferably indicates 1.66 or more of the refractive index.

As an organic glass indicating more than 1.66 of the above-described refractive index, an organic glass obtained by polymerizing and reacting (1) active hydrogen compounds of one or more species selected from the group of polyol, polythiol and hydroxy compound having a mercapto group, and (2) one or more species selected from the group of polyisothiocyanate compound or isothiocyanate compound having an isocyanate group, or, an organic glass obtained by polymerizing and reacting episulfide compound having more than two pieces of structures indicated by the following general formula (4)and a ring-like frame:

General Formula (4)

(where X represents S or O, and the number of pieces of S is more than 50% on average with respect to the total of S and O constituting three-membered ring)

(3) The third invention achieves the above-described object by further laminating a reflection prevention film layer of an inorganic substance based one of the following constitution on the above-described hard coat layer.

The configuration of the reflection prevention film is characterized in that as design center wavelength λ is made as in the range of 450–550 nm, from the foregoing hard coat layer side, it has a multiple layers structure in which a medium refractive index layer having 0.19–0.29 λ of an optic film thickness, a high refractive index layer having 0.42–0.58 λ of an optic film thickness and a low refractive index layer having 0.19–0.29 λ of an optic film thickness were in turn formed.

Furthermore, it is desirable that the medium refractive index layer and the high refractive index layer are consisted of equivalent layer using more than two layers whose refractive index are different, respectively.

It is desirable that in a method of forming the above-described reflection prevention film, before the formation of the reflection prevention film, the cleaning processingof the surface of the hardcoat layer is performed by an ion irradiation.

Then, it is desirable that among the reflection prevention films, the formation of at least high refractive index layer is performed by an ion beam assist method using vapor deposition technique.

(4) A composition for dyeing an organic glass and a method of dyeing an organic glass of the fourth invention achieves the foregoing fourth object.

A composition f or dyeing an organic glass of the fourth invention is characterized in that the dye is made as insoluble-in- water dye, dye carrier agent (sizing agent) is made as acryl based resin, the dye dissolving agent is made as an organic solvent in the range of 8–11 of SP value.

Then, it is desirable that the blending weight ratio of acryl based resin and insoluble-in-water dye is made as the former/the latter=60/40–5/95.

The above-described method of dyeing is characterized in that migration is performed to the base material to be dyed by attaching the above-described composition for dyeing on an organic glass base material or an organic glass base material equipped with a hard coat layer (hereinaf ter, referred to as "base material to be dyed") and by sublimating non-aqueous dye.

BEST MODE FOR CARRYING OUT THE INVENTION

Figure 1:
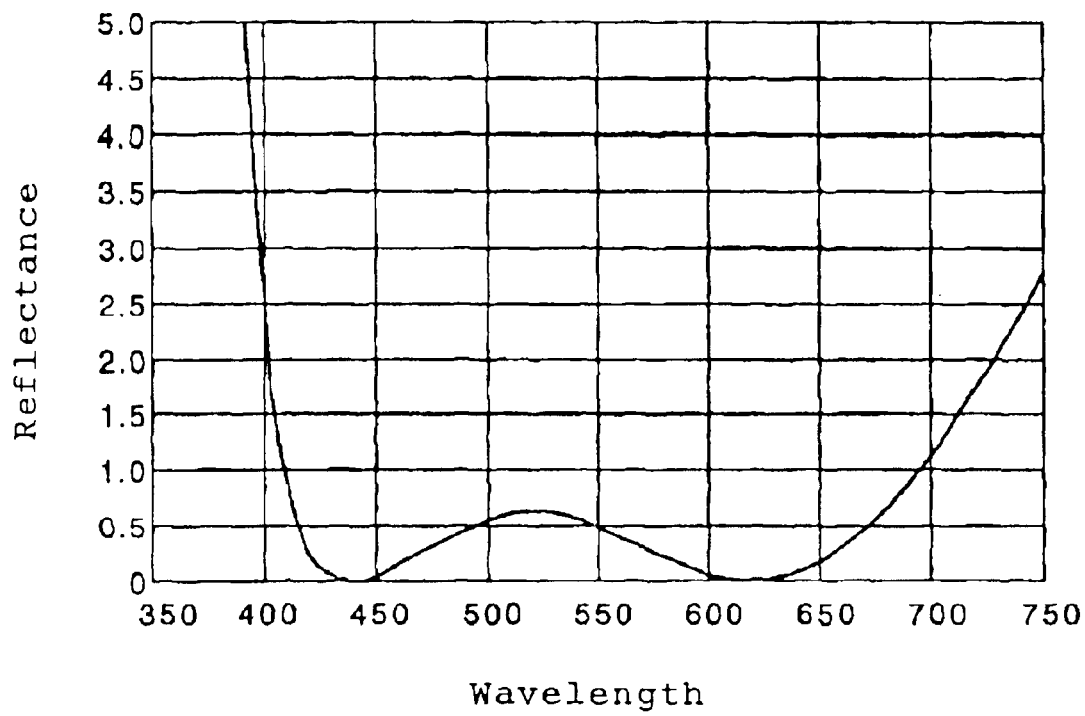
FIG. 1 is a graphical representation showing the relationship between wavelength and reflectivity of lens prepared in Example 4 in the experimental example.

Hereinafter, each constitution of the present invention will be described below in detail. Hereinafter, a blending unit will be considered as a weight unit unless there is particular notice thereof.

A. It is presumed as the prerequisite requirement that a primer composition of the present invention is provided for forming a primer layer between an organic glass and a silicone based hardening coating film.

(1) As the above-described organic glass, there is no particular limitations if its refractive index is in the range from 1.40 to 1.75, and polymethylmetacrylate, fatty polyallylcarbonate, aromatic polyallylcarbonate, polysulfone, polythiourethane (thiourethane resin), poly-thioepoxy (thioepoxy resin) and the like can be listed. Among these, aromatic polyallylcarbonate, polysulfone, polythiourethane, polythioepoxy, which easily achieve a high refractive index (1.66 or more) are desirable.

(2) As for the above-described silicone based hardening coating film (hard coat film), there is no limitations if it is a silicone based one.

For example, catalyst, metal oxide particle (including complex particle) are added to the hydrolysate of organoalkoxy silane, and its viscosity is adjusted by diluent solvent so as to be capable of being coated. Furthermore, the addition of a surfactant, a ultraviolet absorbent and the like can be also performed to this hard coat liquid.

(i) As the above-described organoalkoxysilane, these indicated by the following general formula is capable of being used:

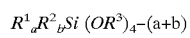

(where $R^1$ represents alkyl group, vinyl group, epoxy group, methacryloxy group, and phenyl group, each having the number of carbon atoms of 1–6, $R^2$ represents alkyl group, alkylene group, cycloalkyl group, alkyl halide group, aryl group, arylalkyl group, and alkylaryl group, each having the number of carbon atoms of 1–3, and $R^3$ represents alkyl group, alkylene group, cycloalkyl group, alkoxyalkyl group, and arylalkyl group, each having the number of carbon atoms of 1–4. Moreover, a=0 or 1, b=0, 1 or 2.) Concretely, tetramethoxysilane, methyltrimethoxysilane, vinyltrimethoxysilane, γ-methacryloxypropyltrimethoxysilane, trimethylchlorosilane, glycidoxymethyltrimethoxysilane, α-glycidoxyethyltrimethoxysilane, β-glycidoxyethyltrimethoxysilane, γ-glycidoxypropyltrimethoxysilane, γ-glycidoxypropylmethyldiethoxysilane and the like can be listed. Other than that these can be used singly, two kinds or more of these can be also used in combination.

(ii) As the above-described catalyst, organic carboxylic acid such as trimellitic acid, trimellitic anhydride, itaconic acid, pyromellitic acid, pyromellitic anhydride and the like, organic compound containing nitrogen such as methyllmidazole dicyandiamide and the like, metal alkoxide such as titanium alkoxide, zirconium alkoxide and the like, metal complex such as aluminum acetylacetone, iron (III) acetylacetone and the like, alkaline metal organic carboxylate such as sodium acetate, potassium acetate and the like can be used.

(iii) As a metal oxide particle, colloidal silica, colloidal titania, colloidal zirconia, colloidal cerium (IV) oxide, colloidal tantalum (V) oxide, colloidal tin (IV) oxide, colloidal antimony (III) oxide, colloidal alumina, colloidal iron (III) oxide and the like, which have mean particle diameter of 5~50 im, can be used, and other than that these can be used singly, two kinds or more of these can be also used in combination, or these can be also used as a complex particle.

(iv) As a diluent solvent, polar solvent such as alcohols, ketones, esters, ethers, Cellosolves and the like can be preferably used.

(v) As a method of coating, it is selected from the known methods such as dipping method, spin coat method and the like. A hardening conditions are made as being at 80–130° C. for 1–4 hours.

(3) Usually, a reflection prevention film is formed on the above-described silicone based hardening coating film. The formation of the relevant reflection prevention film is usually performed by dry-plating method such as vacuum vapor deposition, spattering, ion plating and the like using inorganic particle such as metal, metal oxide, metal fluoride.

As an inorganic substance for forming a reflection prevention film, metal oxide such as silica, titania (IV), tantalum (V) oxide, antimony (III) oxide, zirconia, alumina and the like, and metal fluoride such as magnesium fluoride and the like can be preferably used.

B. A primer composition of the present invention is characterized in that whole of or the main body of the primer layer formation polymer is ester based TPE (hereinafter, referred to as "TPEE"), and it contains a metal oxide particle as optical interference control agent according to the necessity.

(1) As a TPEE, both polyester-polyether type and polyester-polyester type can be used.

The above-described TPEE is a multiblock copolymer in which polyester is used for the hard segment, polyether or polyester is used for the soft segment.

Then, the weight ratio of the hard segment and the soft segment of the relevant TPEE is made as the former/the latter=30/70–90/10, and preferably, 40 /60–80/20. In the case where the ratio of the hard segment is less than 30%, the hardness, modulus, mechanical strength and heat resistance are lowered, and in the case where the ration of the hard segment exceeds over the 90%, the rubber elasticity and the properties at a lower temperature are lowered.

Then, it is desirable that ester based TPE indicates the surface hardness (shore hardness D) in the range of 35–75, the bend elasticity in the range of 40–800 MPa.

Hereinafter, constitutional ingredients of the hard segment and soft segment of TPEE will be concretely exemplified.

(i) Polyester as a Hard Segment Constitutional Ingredient

Basically, these are consisted of dicarboxylic acids and small molecule glycol.

As dicarboxylic acid, aromatic dicarboxylic acid such as terephthalic acid, isophthalic acid, phthalic acid, 2, 6-naphthalenedicarboxylic acid and the like, linear saturated fatty dicarboxylic acid having the number of carbon atoms of 4–20 such as succinic acid, adipic acid, azelaic acid, decamethylenedicarboxylic acid, octadecandicarboxylic acid and the like, fatty oxocarboxylic acid (see the following general formula) such as $\epsilon$-oxycapronic acid and the like, dimeric acid (dibasic acid in which fatty monocarboxylic acid having double bond is dimmericly polymerized) and the like, and ester formative derivatives of these are listed. Among these, terephtalic acid, 2, 6-naphthalenedicarboxylic acid are preferable at the time of being used.

General formula $R^1CO(CH_2)_nCOOH$

Note) $R^1$: alkyl group or H, n: 0–19.

As a small molecule glycol, fatty glycol such as ethylene glycol, trimethylene glycol, 1, 4-butanediol, 1, 5-pentanediol, 1, 6-hexanediol, neopentyl glycol and the like, fatty glycol such as 1, 6-cyclohexanedimethanol and the like and ester formative derivatives of these are listed. Among these, ethylene glycol and 1, 4-butanediol are preferable at the time of being used.

(ii) Polyester as Soft Segment Constitutional Ingredient

Consisted of dicarboxylic acids and long chain glycol, and as a dicarboxylic acid the foregoing ones are listed.

As a long chain glycol, poly (1, 2-butadiene glycol), poly (1, 4-butadiene glycol) and its hydrogen additives and the like are listed.

Moreover, $\epsilon$-caprolactone (C6). enantholactone (C7) and caprylolactone (C8) are also useful as a polyester ingredient.

Among these, $\epsilon$-caprolactone is preferable at the time of being used.

(iii) Polyether as Soft Segment Constitutional Ingredient

Poly (alkylene oxide) glycols such as poly (ethylene oxide) glycol, poly (1, 2-propylene oxide) glycol, poly (1, 3-propylene oxide) glycol, poly (tetramethylene oxide) glycol and the like are listed, among these, poly (tetramethylene oxide) glycol is desirable at the time of being used.

The above-described TPEE is capable of being manufactured by the method of common use. Concretely, lower alkyl ester of dicarboxylic acid, fatty long chain glycol and excessive small molecule glycol are heated at the temperature of 150–200° C. in the presence of catalyst such as tetrabutyltitanate and the like, ester exchange is performed, first, low polymer is formed, and further, this low polymer is heated and agitated under the high vacuum at the temperature of 220–280° C., polycondensation is performed to be TPEE. The foregoing low polymer can be also obtained by performing the direct esterification reaction of dicarboxylic acid, long chain glycol and small molecule glycol.

In the above-described description, as a polymer capable of being combined in the case where TPEE is not made to be whole of the coating film formation polymer, but is made as its main body, there is no limitations if it is capable of being mixed with TPEE, usual ester based resins (PBT, PET and the like), amide based resin, and further, amide based TPE and the like are optionally used, and usually, the ratio occupying in polymer as a whole, is less than 50%, and desirably less than 30%.

These TPEE may be added in a form of solution-type, however, it is desirable from the viewpoint of workability and the protection of environment that it is added in a form of aqueous emulsion.

Although this aqueous emulsification can be performed by the method of common use, concretely, a forced emulsification method in which a polymer is mechanically cut and forcefully emulsified in the presence of surfactant (external emulsion) is desirable.

As a surfactant usually used, (i) anionic surfactant; alkylbenzenesulfonic acid soda such as sodium laurylbenzenesulfonic acid, sodium dioctylsulfosuccinate and the like, (ii) cationicsurfactant; quaternary ammonium salt, (iii) nonionic surfactant: polyethylene glycol, ethylene oxide additives of long chain alcohol, ethylene oxide additives of alkylphenol and the like are listed, Among these, sodium laurylbenzenesulfonic acid is desirable at the time of being used.

Moreover, an ionic hydrophilic group is introduced to a polymer, by an auto emulsification method in which it is stably dispersed into water without any assistance of an emulsion or the methods may be used in combination.

It is desirable that the relevant primer composition (coating) is made to contain metal oxide particle (including complex particle) for the purpose of adjusting the refractive index and enhancing the strength and the like.

For this metal oxide particle, one used for a hard coat described above can be used, it is desirable that from the viewpoint of the handling, it is added in a form of colloidal solution (sol) of the metal oxide particle (colloidal particle). It is desirable that this colloidal solution is appropriately used while its disperse medium is replaced with a polar solvent used for the primer described later.

For example, colloidal silica, colloidal titania, colloidal zirconia, colloidal cerium (IV) oxide, colloidal tantalum (V) oxide, colloidal tin (IV) oxide, colloidal antimony (III) oxide, colloidal alumina, colloidal iron (III) oxide and the like, whose average particle diameter is in the range of 1–100 $\mu$m, desirably in the range of 5–50 $\mu$m can be used. Other than that these are capable of being used singly, two kinds or more of these can be also capable of being, used in combination, or these are also capable of being used as a complex particle.

At this time, the blending ratio (weight) of the metal oxide particle is made as the metal oxide particle/TPEE=1/99–80/20, desirably, 2/98–70/30, more desirably, 4/96–60/40. In the case where the metal particle is less than 1%, it is difficult to exert the refractive index adjustment action, and in the case where the metal particle exceeds over 80%, the shock resistance becomes inferior, and the cloudiness is significantly emerged by the scattering of light.

(e) Then, as a primer composition of the present invention consisted of these respective ingredients, usually, one or more than two kinds of the polar solvents similar to these used for the foregoing coating for the hard coat, that is, alcohols, ketones, esters, ethers, and Cellosolves (monoalkyl ether of ethylene glycol) and the like are used in combination while adding a diluent solvent.

Moreover, as to a primer composition of the present invention, the blending of the ultraviolet ray absorbent such as benzophenon based one, benzotriazole based one, and phenol based one and the like and the blending of a leveling agent containing a silicone based surfactant, fluorine based surfactant and the like for the purpose of enhancing the smoothness of the coating and the blending of the other reforming agent are capable of being carried out.

As a coating method, a method is selected from the known methods such as a dipping method, a spin coat method and the like. The hardening of the primer layer comprises the preliminary hardening and the main hardening. The conditions of the preliminary hardening are made as being room temperature up to 150° C. for 3 minutes to 2 hours, and desirably in the range from 80 to 110° C. for 5 minutes to 1 hour. Since the main hardening is performed at the same time with the silicone based hard coat, the conditions is the hardening conditions of the afore-described hard coat (80–130° C.×1–4 hours). In the case where the preliminary hardening is exceeded over a long time at a high temperature, the adhesiveness with upper layer silicone based hard coat film is lowered, and in the case where the preliminary hardening is not sufficient, the coating film is likely to be milkiness.

The film thickness of this primer layer is made as being in the range of 0.01–10 $\mu$m, and desirably in the range of 0.1–10 $\mu$m. In the case where it is less than 0.01 $\mu$m, the effect of the shock resistance is not expected to be enhanced, and in the case where it exceeds over 10 $\mu$m, a problem involving with the surface precision becomes easily occurred.

As the other reforming agent, poly (vinyl butyral) can be used as a thickener for enhancing the film thickness without lowering the shock resistance. As an amount of addition, it is made as being in the range of 0–5% (calculated as solid content), if it exceeds over 5%, a problem involving with the surface precision occurs and the water resistance of the primer film is lowered.

The thermosetting resin such as melamine resin and the like can be used for adjusting the coating film hardness. As an amount of addition, it is in the range of 0–20% (calculated as solid content), and if it exceeds over 20%, it results in a malfunction involving with the shock resistance.

B. (a) It is presumed as prerequisite requirement that for a hard coat composition of the present invention, the hydrolysate of the alkoxysilane mainly consisted of alkoxysilane containing monoepoxy organic group is made as a matrix formation ingredient and titania based metal oxide complex particle is made as an optical interference control agent.

(b) The most significant characteristic of the present invention is in that the titania based metal oxide complex particle is consisted of $TiO_2$ as the main body, $SiO_2$ as the major sub-ingredient and further, $ZrO_2$ and $K_2O$ as trace sub-ingredient.

Concretely, the specification of the titania based complex particle is not particularly limited if a high refractive index corresponding characteristics (refractive index enhancement action) is obtained and it is in the range of exerting the action of the above-described optical interference suppression agent.

(1) The average particle diameter of the complex particle is made as being in the range of 1–100 nm, and desirably 2–50 nm, and further desirably, in the range of 4–25 nm. If the particle diameter of the complex particle is small, the abrasive resistance is not only capable of being expected to be enhanced, but also the aggregation is easily occurred, and the uniformity of the coating film is likely to be inhibited. Conversely, if the particle diameter of the complex particle is large, the coating film is easily to be milkiness, and the appearance is likely to be damaged.

(2) The composition of the respective metal oxides are defined to satisfy the respective weight ratios as follows:

$SiO_2/TiO_2$=0.1900–0.2100, desirably, 0.1950–0.2050.
$ZrO_2/TiO_2$ =0.0015–0.023, desirably, 0.002–0.020.
$K_2O/TiO_2$=0.0012–0.012, desirably. 0.002–0.010.
$SiO_2/ZrO_2/K_2O$=100/0.789/0.632–100/10.953/5.714, desirably, 100/1.026/1.026–100/9.756/4.878.

The metal oxide complex particle is constituted by integrally coupling $SiO_2$, $ZrO_2$ and $K_2O$ to $TiO_2$. The desirable form at this time is defined as replacement type solid solution in which the respective sub-ingredients are uniformly melted together to $TiO_2$.

Now, $SiO_2$ which is the major sub-ingredient exerts an action not only for increasing the miscibility with silane compound (alkoxysilane hydrolysate) in preparing coating but also an action for enhancing the light resistance of the coating film. In the case where the ratio of the $SiO_2$ is large, the action for enhancing the refractive index that $TiO_2$ has is inhibited, and a high refractive index correspondence becomes difficult.

Moreover, $ZrO_2$ and $K_2O$ which are trace sub-ingredients do not synergetically inhibit the refractive index enhancement action that $TiO_2$ has, but exerts to suppress the optical activity of $TiO_2$. In the case where one of $ZrO_2$ and $K_2O$ is excessive, the synergetical action of suppression of the above-described optical activity is not easily obtained.

Therefore, the deterioration action against both coating film and the object matter to be coated (organic glass) by near-ultraviolet ray can be reduced.

(3) A method of manufacturing the above-described metal oxide complex particle is performed similarly to, for example, the method described in Japanese Unexamined Patent Publication No. Hei 2–178219 gazette. Specifically, after $TiO_2$ hydration sol and $ZrO_2/K_2O$ hydration sol are prepared and deflocculation is performed to it, resolved by adding hydrogen peroxide, and further, hydrolyzed at a high temperature by adding silicic acid dispersion liquid. The above-described silicic acid dispersion liquid is prepared, for example, by dealkalizing an alkali-silicic acid aqueous solution. The above-described hydrosate is a dispersion liquid of the particle. It is desirable that this particle dispersion liquid is purified and processed by an ion exchange method, a reverse osmosis method, an ultrafiltration method, a vacuum vapor deposition method.

It should be noted that it is desirable that the above-described complex particle is surface-reformed with a silane coupling agent and used. In this way, the miscibility with the silane compound is further enhanced by surface-reforming the metal oxide complex particle, in the viewpoint of the esthetic appearance after the film coating, the cloudiness can be reduced. The term "surface reforming" is referred to a processing by which the disperse character of the complex particle is made to be better by blocking hydroxyl group remained in $TiO_2$, $ZrO_2$, $SiO_2$ and $K_2O$ using the silane coupling agent. This surface reforming can be carried out by the method of common use. For example, it is performed by dipping in the alcohol solution into which the following organic silane compound is resolved.

As a silane coupling agent (surface reforming agent), tetramethoxysilane, methyltrimethoxysilane, trimethylchlorosilane, vinyltriethoxysilane, γ-glycidoxypropyltriethoxysilane, γ-glycidoxypropylmethyldiethoxysilane and the like can be preferably used.

(4) The blending amount of this complex particle is made as 10–500 portions with respect to 100 portions of the above-described total amount of alkoxysilane, and desirably, in the range of 20–200 portions, and further, desirably, in the range of 40–100 portions.

In the case where the relevant metal oxide complex particle is slight, the high refractive index base material correspondence becomes difficult as well as the sufficient coating film hardness cannot be obtained, conversely, in the case where it is much, the coating film milkiness phenomenon and the poor appearance due to the cracks at the time when its hard coat coating film is hardened (thermal polymerization) are easily occurred.

(c) The matrix formation ingredient in a hard coat composition of the present invention is consisted of (1) hydrolysate of alkoxysilane, and (2) organic metal compound as a hardening agent as the major ingredients.

(1) The above-described alkoxysilane is consisted of trialkoxysilane monoepoxy group as the main body, and usually used with tetraalkoxysilane in combination.

Then, the above-described trialkoxysilane is expressed by the following general formula (1):
General Formula (1)

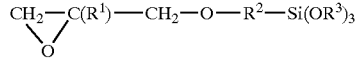

(where $R^1$ represents H or $CH_3$, $R^2$ represents alkylene group having the number of carbon atoms of 1–4, and $R^3$ represents alkyl group having the number of carbon atoms of 1–4), or, it is desirable that it is consisted of one or more than one species selected from the group expressed by the following general formula (2):
General Formula (2)

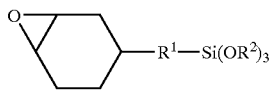

(where $R^1$ represents alkylene group having the number of carbon atoms of 1–4, and $R^2$ represents alkyl group having the number of carbon atoms of 1–4)

As a concrete example of the above-described general formula (1), the followings can be listed. Among these compounds, particularly, $R^2$ having the number of carbon atoms of 3–4 is desirable.

glycidoxymethyltrimethoxysilane,
glycidoxymethyltriethoxysilane,
glycidoxymethyltripropoxysilane,
glycidoxymethyltributoxysilane,
α-glycidoxyethyltrimethoxysilane,
α-glycidoxyethyltriethoxysilane,
α-glycidoxyethyltripropoxysilane,
α-glycidoxyethyltributoxysilane,
β-glycidoxyethyltrimethoxysilane,
β-glycidoxyethyltriethoxysilane,
β-glycidoxyethyltripropoxysilane,
β-glycidoxyethyltributoxysilane,
α-glycidoxypropyltrimethoxysilane,
α-glycldoxypropyltriethoxysilane,
α-glycidoxypropyltrlpropoxysilane,
α-glycldoxypropyltrlbutoxysilane,
β-glycidoxypropyltrimethoxysilane,
β-glycidoxypropyltriethoxysilane,
β-glycidoxypropyltripropoxysilane,
β-glycidoxypropyltributoxysilane,
γ-glycidoxypropyltrimethoxysilane,
γ-glycidoxypropyltriethoxysilane,
γ-glycidoxypropyltripropoxysilane,
γ-glycidoxypropyltributoxysilane,
α-glycidoxybutyltrimethoxysilane,
α-glycidoxybutyltriethoxysilane,
α-glycidoxybutyltripropoxysilane,
α-glycidoxybutyltributoxysilane,
β-glycidoxybutyltrimethoxysilane,
β-glycidoxybutyltriethoxysilane,
β-glycidoxybutyltripropoxysilane,
β-glycidoxybutyltributoxysilane,
γ-glycidoxybutyltrimethoxysilane,
γ-glycldoxybutyltriethoxysilane,
γ-glycidoxybutyltripropoxysilane,
γ-glycidoxybutyltributoxysilane,
δ-glycidoxybutyltrimethoxysilane,
δ-glycidoxybutyltriethoxysilane,
δ-glycidoxybutyltripropoxysilane,
δ-glycidoxybutyltributoxysilane,
β-methylglycidoxymethyltrimethoxysilane,
β-methylglycidoxymethyltriethoxysilane,
β-methylglycidoxymethyltripropoxysilane,
β-methylglycidoxymethyltributoxysilane,
β-methyl-α-glycidoxyethyltrimethoxysilane,
β-methyl-α-glycidoxyethyltriethoxysilane,
β-methyl-α-glycidoxyethyltripropoxysilane,
β-methyl-α-glycidoxyethyltributoxysilane,
β-methyl-β-glycidoxyethyltrimethoxysilane,
β-methyl-β-glycidoxyethyltriethoxysilane,
β-methyl-β-glycidoxyethyltripropoxysilane,
β-methyl-β-glycidoxyethyltributoxysilane,
β-methyl-α-glycidoxypropyltrimethoxysilane,
β-methyl-α-glycidoxypropyltriethoxysilane,
β-methyl-α-glycidoxypropyltripropoxysilane,
β-methyl-α-glycidoxypropyltributoxysilane,
β-methyl-β-glycidoxypropyltrimethoxysilane,
β-methyl-β-glycidoxypropyltriethoxysilane, β-methyl-β-glycidoxypropyltripropoxysilane,
β-methyl-β-glycidoxypropyltributoxysilane,
β-methyl-γ-glycidoxypropyltrirethoxysilane,
β-methyl-γ-glycidoxypropyltriethoxysilane,
β-methyl-γ-glycidoxypropyltripropoxysilane,
β-methyl-γ-glycidoxypropyltributoxysilane,
β-methyl-α-glycidoxybutyltrimethoxysilane,
β-methyl-α-glycidoxybutyltriethoxysilane,
β-methyl-α-glycidoxybutyltripropoxysilane,
β-methyl-α-glycidoxybutyltributoxysilane,
β-methyl-β-glycidoxybutyltrimethoxysilane,
β-methyl-β-glycidoxybutyltriethoxysilane,
β-methyl-β-glycidoxybutyltripropoxysilane,
β-methyl-β-glycidoxybutyltributoxysilane,
β-methyl-γ-glycidoxybutyltrimethoxysilane,
β-methyl-γ-glycidoxybutyltriethoxysilane,
β-methyl-γ-glycidoxybutyltripropoxysilane,
β-methyl-γ-glycidoxybutyltributoxysilane,
β-methyl-δ-glycidoxybutyltrimethoxysilane,
β-methyl-δ-glycidoxybutyltriethoxysilane,
β-methyl-δ-glycidoxybutyltripropoxysilane, and
β-methyl-δ-glycidoxybutyltributoxysilane.

As concrete examples of the above-described general formula (2), the followings can be listed. Among these compounds, particularly, $R^1$ having the number of carbon atoms of 2–4 is desirable.

(3, 4-epoxycyclohexyl) methyltrimethoxysilane,
(3, 4-epoxycyclohexyl) methyltriethoxysilane,
(3, 4-epoxycyclohexyl) methyltripropoxysilane,
(3, 4-epoxycyclohexyl) methyltributoxysilane,
(3, 4-epoxycyclohexyl) ethyltrimethoxysilane,
(3, 4-epoxycyclohexyl) ethyltriethoxysilane,
(3, 4-epoxycyclohexyl) ethyltripropoxysilane,
(3, 4-epoxycyclohexyl) ethyltributoxysilane,
(3, 4-epoxycyclohexyl) propyltrimethoxysilane,
(3, 4-epoxycyclohexyl) propyltriethoxysilane,
(3, 4-epoxycyclohexyl) propyltripropoxysilane,
(3, 4-epoxycyclohexyl) propyltributoxysilane,
(3, 4-epoxycyclohexyl) butyltrimethoxysilane,
(3, 4-epoxycyclohexyl) butyltriethoxysilane,
(3, 4-epoxycyclohexyl) butyltripropoxysilane, and
(3, 4-epoxycyclohexyl) butyltrlbutoxysilane.

As tetraalkoxysilane with which the above-described trialkoxysilane is used, it is desirable that one or more than one species selected from the group indicated by the following general formula (3) is used.

General Formula (3)
(where $R^1$ represents alkyl group having the number of carbon atoms of 1–4)

More concretely, tetraethoxysilane, tetramethoxysilane, tetrapropoxysilane, tetrabutoxysilane and the like can be listed.

The hydrolysate of the above-described alkoxysilane is prepared by carrying out the process that a drop of dilute acid of 0.01–0.1 N is added to alkoxysilane in the presence of lower alcohol such as methanol, ethanol and the like and then hydrolysis is performed. As a dilute acid, concretely, hydrochloric acid, sulfuric acid, phosphoric acid, acetic acid, formic acid, oxalic acid, sulfonic acid and the like can be used.

Then, the blending ratio of the above-described tetraalkoxysilane to the above-described trialkoxysilane containing epoxy is made as being 5.3–25 weight portions of tetraalkoxysilane to 100 weight portions of trialkoxysilane. If the blending ratio is out of this range, the sufficient coating hardness and the excellent appearance are not easily obtained. Specifically, in the case where tetraalkoxysilane is excessive, the poor appearance due to the cracks occurs at the time when the thermal polymerization is performed following coating film on organic lens, and in the case where it is too little, sufficient coating film hardness is not easily obtained.

(2) As the above-described organic metal compound (metal chelate), one or more than one species selected from any of Cr (III), Co (III), Fe (III), Zn (II), In (III), Zr (IV), Y (III), Al (III), Sn. V, and Ti (II) with which a chelating agent selected from ethylenediamine-tetraacetic acid, hexafluoroacetylacetone, trifluoroacetylacetone, acetylacetone and methyl acetoacetate coordinates, can be used.

Among these, iron (III) acetylacetone, iron (III) hexafluoroacetylacetone, tin acetylacetone, vanadyl acetyl acetone, indium (III) acetylacetone, zirconium (IV) acetylacetone, second cobalt (III) acetylacetone, titanium (II) acetylacetone and aluminium (III) acetylacetone are desirable.

The amount of addition of this organic metal compound is made as being 0.1–10 portions (desirably, 0.3–5 portions) with respect to 100 portions of the total alkoxysilane hydrolisate (solid content).

It should be noted that alkoxysilane compound, if it is hydrolyzed, usually is reduced by 25–35% as weight.

Furthermore, trace of ultraviolet ray absorbent, antioxidant agent, disperse dye, antistatic agent, surfactant is capable of being added to a hard coat composition of the present invention for the purpose of improving the coating film character and appearance performance according to the necessary.

Concretely, as an ultraviolet absorbent, benzotriazol based absorbent, benzophenon based absorbent and the like is capable of being used, hindered amine based absorbent is useful when it is used in combination with an antioxidant agent. As a disperse dye, aqueous disperse dye is used.

As a surfactant, it is desirable that nonionic surfactant in which the hydrophobic group is consisted of dimethylsilicone oil and the hydrophilic group is consisted of polyether is used for the purpose of enhancing the smoothness and antistatic characteristics. These characteristics are obtained by fluorine based surfactant and the like, however, among fluorine based surfactants, particularly as to macromolecules, in the case where these are used in combination with $TiO_2/SiO_2/ZrO_2/K_2O$ of metal oxide complex particles which are (C) ingredients, since these have also a characteristic easily aggregating the relevant metal oxide complex particles, it requires care when these are used. Moreover, as an amount of usage of surfactant, 0.01–0.5 portions (desirably, 0.03–0.3 portions) of a surfactant is used with respect to 100 portions of the hard coat composition (the total weight of matrix formation ingredients and metal oxide complex particles). In the case where it is less than 0.01 portions, the sufficient smoothness and antistatic characteristics are not easily obtained, and in the case where it exceeds over 0.5 portions, the cloudiness is easily occurred at the time of forming film even if a silicone based surfactant is used.

C. An optical element of the present invention is characterized in that the above-described primer layer is intervened between the foregoing organic glass and the silicone based hardening coating film in the optical element which is constructed by forming a silicone based hardening coating film on the organic glass.

Moreover, an optical element of the present invention has a hard coat layer which is formed by the hard coat composition constituted as above-described on an organic glass base material indicating more than 1.66 of the refractive index.

Now, as an organic glass, for example, an organic glass obtained by polymerizing and reacting (i) an active hydrogen compound consisted of hydroxy compound having polyol, polythiol and mercapto group, and (ii) one or more species selected from the group of polyisothiocyanate compounds and isothiocyanate compounds having an isocyanate group can be preferably used (see for example, Japanese Unexamined Patent Publication No. Hei 2-167330, gazette). For this isothiocyanate compound, a compound having more than one piece of sulfur atoms in addition to an isothiocyanate group are also used.

The above-described polyisothiocyanate is referred to a compound having more than one of —NCS groups in one molecule, and it may be available even if it has one or more piece of sulfur atoms in addition to an isothiocyanate group.

For example, fatty isothiocyanate such as 1, 2-diisothiocyanate ethane, 1, 3-diisothiocyanate propane, 1, 4-diisothiocyanate butane, 1, 6-diisothiocyanate hexane, p-phenylenediisopropylidinediisothiocyanate and the like, alicyclic isothiocyanate such as cyclohexanediisothiocyanate and the like, isothiocyanate containing a heterocycle such as 1, 2-diisothiocyanate benzene, 1, 4-diisothiocyanate benzene, 2, 4-diisothiocyanate toluene, 2, 5-diisothiocyanate-m -xylene, 4, 4-diisothiocyanate-1, 1-biphenyl, 1, 1-methylene bis (4-isothiocyanate benzene), 1, 1-methylene bis (4-isothiocyanate-2-methylbenzene), 1, 1-methylene bis (4-isothiocyanate-3-methylbenzene) and the like, and further, carbonylisothiocyanate such as hexanedioel isothiocyanate, nonanedioeldiisothiocyanate, and carbonic diisothiocyanate and the like can be preferably used.

As a polyisothiocyanate containing one or more pieces of sulfur atoms in addition to an isothiocyanate group, fatty isothiocyanate containing sulfur such as thio bis (3-isothiocyanate propane), thio bis (2-isothiocyanate ethane), dithio bis (2-isothiocyanate ethane) and the like;

aromatic isothiocyanates containing sulfur such as 1-isothiocyanate-4-((2-isothiocyanate ethyl) sulfonyl) benzene, thio bis (4-isothiocyanate benzene) and the like; and Heterocyclic compound containing sulfur such as thiophene-2, 5-diisothiocyanate, 1, 4-dithiane-2, 5-diisothiocyanate and the like can be preferably used.

As an isothiocyanate compound having the foregoing isocyanate group, for example, fatty or alicyclic compound such as 1-isocyanate-3-isothiocyanate propane, 1-isocyanate-5-isothiocyanate pentane, 1-isocyanate-6-isothiocyanate hexane, 1-isocyanate-4-isothiocyanate cyclohexane and the like; and aromatic compound such as 1-isocyanate-4-isothiocyanate benzene and the like can be preferably used.

For the above-described active hydrogen compound, one or more species can be selected from hydroxy compounds having polyol, polythiol, and mercapto groups.

As a polyol, for example, fatty polyol such as ethylene glycol, diethylene glycol, propylene glycol, dipropylene glycol, butylene glycol, neopentyl glycol, glycerin, trimethylol ethane, trimethylol propane, butane triol, 1, 2-methylglucoside, pentaerythritol, dipentaerythritol, tripentaerythritol, sorbitol, erytritol, slatol, ribitol, arabinitol, xylitol, allitol, mannitol, dorsitol, iditol, glycol, inositol, hexanetriol, triglycellose, diglyperole, triethylene glycol, polyethylene glycol, tris (2-hydroxyethyl) isocyanurate, cyclobutanediol, cyclopentanediol, cyclohexanediol, cycloheptanediol, cyclooctanediol, cyclohexanedimethanol, hydroxypropylcyclohexanol, bicyclo (4, 3, 0)-nonanediol, dicyclohexanediol, tricyclo (5, 3, 1. 1) dodecanediol, bicyclo (4, 3, 0)nonanedimethanol, tricyclo(5, 3, 1, 1) dodecanediethanol, hydroxypropyltricyclo (5, 3, 1, 1) dodecanol, spiro (3, 4) octanediol, butylcyclohexanediol, 1, 1-bicyclohexyledendiol, cyclohexanetriol, maltitol, lactitol and the like;

aromatic polyol such as dihydroxynaphthalene, trihydroxynaphthalene,tetrahydroxynaphthalene, dihydorxybenzene, benzenetriol, biphenyltetraol, pyrogallol, (hydroxynaphthyl) pyrogallol, trihydroxyphenanthrene, bisphenol A, bisphenol F, xylileneglycol, di (2-hydroxyethoxy) benzene, bisphenol A-bis-(2-hydroxyethylether), tetrabrominebisphenol A-bis-(2-hydroxyethylether) and the like;

polyol halide such as dibromoneopentyl glycol;

macromolecule polyol such as epoxy resin and the like; and further, addition reaction products of organic acids such as oxalic acid, glutamic acid, adipic acid, acetic acid, propionic acid, cyclohexanecarboxylic acid, β-oxocyclohexanepropionic acid, dimeric acid, phthalic acid, isophthalic acid, salicylic acid, 3-bromopropionic acid, 2-bromo glycol, dicarboxycyclohexane, pyromellitic acid, butanetetracarboxylic acid, bromophthalic acid and the like, the foregoing polyol, and alkyleneoxide such as ethyleneoxide, propyleneoxide and the like;

addition reaction products of alkylenepolyamine and alkyleneoxide such as ethyleneoxide, propyleneoxide and the like;

polyols containing a sulfur atom such as bis-(4-(2-hydroxyethoxy) phenyl) sulfide, bis-(4-(2-hydroxypropoxy) phenyl) sulfide and compounds to which propyleneoxide is added, di-(2-hydroxyethyl) sulfide), 1, 2-bis (2-hydroxyethylmercapto) ethane, 1, 5-dihydroxy-1, 4-dithiane and the like can be preferably used.

Moreover, as a polythiol, fatty polythiol such as methanedithiol, 1,2-ethanedithiol, 1,1-propanethiol, 1, 1-cyclohexanedithiol, 2, 2-cyclohexanedithiol, diethylene glycolbis (2-mercaptacetate), ethylene glycol bis (2-mercaptoacetate) and the like;

aromatic polythiols such as 1, 2-dimercaptobenzene, 1. 2, 3-trimercaptobenzene, 1, 2, 3-tris (mercaptoethyleneoxy) benzene, 1, 2, 3, 5-tetramercaptobenzene, 1, 4-naphthalenedithiol, 2, 4-dimethylbenzene-1, 3-dithiol and the like;

halogen substitution aromatic polythiol such as chlorine substitution products such as 2, 5-dichlorobenzene-1, 3-dithiol, 3, 4. 5-tribromine-1. 2-dimercaptobenzene and bromine substitution products and the like;

polythiols containing a heterocycle such as 2-methylamino-4, 6-dithiol-sym-triazine, 2-cyclohexylamino-4, 6-dithiol-sym-triazine and the like;

aromatic polythiols containing a sulfur atom in addition to mercapto group such as nuclear alkylate such as 1, 2-bis (mercaptomethylthio) benzene and the like;

fatty polythiols containing a sulfur atom in addition to a mercapto group such as bis (mercaptomethyl) sulfide, bis (mercaptomethylthio) methane, tetrakis (mercaptomethylthiomethyl)methane and the like, or esters of thioglucolic acid and mercaptopropionic acid of these, hydroxymethylsulfide bis (2-mercaptoacetate), 2-mercaptoethylether bis (2-mercaptoacetate), 1, 4-dithiane-2, 5-diol bis (2-mercaptoacetate), thioglycolicacidbis (2-mercaptoethyl ester) and the like; and heterocyclic compounds containing a sulfur atom in addition to mercapto group such as 3, 4-thiophenedithiol and the like can be preferably used.

Moreover, as a hydroxy compound having a mercapto group (thiol group), 2-mercaptoethanol, 3-mercapto-1, 2-propanediol, glycerin di (mercaptoacetate), 1-hydroxy-4-mercaptocyclohexane, 2, 4-dimercaptophenol, 2-mercaptohydroxynon, 4-mercaptophenol, 3, 4-dimercapto-2-propanol, 1, 3-dimercapto-2-propanol, 2, 3-dimercapto-1-propanol, 1,2-dimercapto-1, 3-butanediol, pentaerythritol tris (3-mercaptopropionate), pentaerythritol mono (3-mercaptopropionate), pentaerythritol bis (3-mercaptopropionate), pentaerythritol tris (thioglycol), pentaerythritol pentakis (3-mercaptopropionate), hydroxymethyl-tris (mercaptoethylthiomethyl) methane, 1-hydroxyethylthio-3-mercaptoethylthiobenzene, 4-hydroxy-4-mercaptodiphenylsulfone, 2-(2-mercaptoethylthio) ethanol, dihydroxyethylsufide mono (3-mercaptopropionate), dimercaptoethane mono (salicylate), hydroxyethylthiomethyl tris (mercaptoethylthio) methane and the like are listed.

Furthermore, halogen substitution product of these active hydrogen compounds (ex; chlorine substitution products and bromine substitution products) can be also used. These are capable of being used singly and one or more species of these can be also mixed and used in combination.

Then, an organic glass used for an optical element of the present invention is obtained by polymerizing and reacting the above-described isothiocyanate compound and active hydrogen compound so that the functional group molar ratio of (NCO+NCS)/(OH+SH) is usually in the range of 0.5–3.0, desirably in the range of 0.5–1.5, more desirably in the range of 0.8–1.2.

As the other organic glass indicating a high refractive index, an organic glass having two or more of the structure indicated by the following general formulation (4), which is obtained by polymerizing and hardening episulfide compound having a cyclic skeleton can be preferably used (for example, see Japanese Unexamined Patent Publication No. Hei 9-71580, gazette).

General Formula (4)

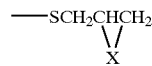

(where X represents S or O, the number of pieces of S is on average more than 50% with respect to the total of S and O which constitute three membered ring).

Concretely, an organic glass which is represented by the following general formula (5) can be preferably used.

General Formula (5)

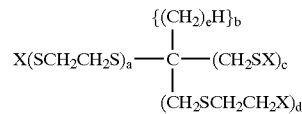

(where X represents

(Y represents S r O), a, b, c, d and e are integer satisfying the following equations: a+b+c+d=4; a, b=0 or 1; c, d=0, 1, 2, 3 or 4; e=0, 1, 2 or 3)

As a method of coating the above-described object matter to be coated (organic glass), brushing coating method, dipping coating method, roller coating method, spray coating method, spin coating method and the like can be listed. Moreover, as an example of drying-hardening conditions, the conditions under which the coating is performed at 60° C.–150° C. is preferable, and particularly preferably at 80° C.–120° C. for 1–5 hours, and the thickness of the coated film obtained after hardening is in the range of 0.5 $\mu$m–20 $\mu$m.

It is desirable that before the coating of a composition of the object matter to be coated of the present invention is performed, a degrease washing by an acid-alkali washing solvent, plasma processing, ultrasonic cleaning and the like are performed.

D. It is desirable that a reflection prevention film of an inorganic substance based one is further laminated on the foregoing hard coat layer.

As a reflection prevention film capable of forming on the hardening coating film, inorganic matters such as a metal simple body, a metal oxide, metal fluoride and the like are listed. As a metal oxide, $SiO_2$, SiO, $TiO_2$, $Ta_2O_5$, $CeO_2$, $Nb_2O_5$, $Sb_2O_3$, $ZrO_2$, $Al_2O_3$ and $Y_2O_3$ can be listed, and a single or more species of them can be appropriately selected and used. As a metal fluoride, $MgF_2$ and the like can be listed from them and a single and/or more species of them can be appropriately selected and used. Moreover, by utilizing non-transparent metal zirconium and TiO, $Ti_2O_3$, $Ti_3O_5$ and the like as a starting raw material, the film is capable of being formed by the method described later.

For a reflection prevention film provided on the hard coat film, as a fundamental film configuration, there are a two-layers type in which $\lambda/2$ and $\lambda/4$ of the thickness of the optical films are in turn laminated from the side of the substrate (hard coat), and a three-layers type in which $\lambda/4$, $\lambda/2$ and $\lambda/4$ of the thickness of the optical films are in turn laminated from the side of the substrate and so forth, however, since the wavelength area of the reflection prevention can be widened, the three-layers type is preferable.

In the present invention, as a reflection prevention film, a film in which the design center wavelength $\lambda$ is made as being targeted in the range of 450–550 nm, a medium refractive index layer having an optical film thickness of 0.19–0.29 $\lambda$, a high refractive index layer having an optical film thickness of 0.42–0.58 $\lambda$, and a low refractive index layer having an optical film thickness of 0.19–0.29 $\lambda$ are in turn formed from the side of the foregoing hard coat layer is desirable. This is because a wavelength area with which the reflection prevention film is capable of corresponding can be widened.

The film thickness and refractive index of the respective layers are different depending on the refractive index of the hard coat film laying beneath or below. As a concrete example, each of optical film thickness is made as being in the range of 100–140 nm for the medium refractive index layer, in the range of 220–260 nm for the high refractive index layer, and in the range of 100–140 nm of the low refractive index layer, and the constitutions in which inorganic materials indicated below are employed can be used.

(α) $SiO_2/ZrO_2$: 1/4 λ (medium refractive index layer)
$ZrO_2$: 1/2 λ (high refractive index layer)
$SiO_2$: 1/4 λ (low refractive index layer)
(β) $SiO_2/TiO_2$: 1/4 λ (medium refractive index layer)
$TiO_2$: 1/2 λ (high refractive index layer)
$SiO_2$: 1/4 λ (low refractive index layer)

In the case where there is no substance having a suitable refractive index, an equivalent film in which one or more layers having different refractive indexes are used can be used. It is desirable that the medium refractive index layer in the above-described concrete example is formed by the equivalent film method in which the substances used for the high refractive index layer and the low refractive index layer are used and the film is formed.

Now, the term equivalent film methods is referred to a method in which if a substance having the desired refractive index from the requirement on the design of a reflection prevention film is absent, a substance having a higher refractive index than that substance and a substance having a lower refractive index than that substance are alternately formed into films making an optically equivalent multi-player film to substitute the substance.

E. When a reflection prevention film of the present invention is formed into a film, in order to enhance the adhesive force of the reflection prevention film to the hard coat film, it is desirable that the surface processing of the hard coat film is performed as a prior processing. As a concrete example, a drug processing using acid, alkali, argon or oxygen plasma processing by a high frequency, and oxygen ion or argon ion irradiation processing by an ion gun are listed.

Among the above-described ones, it is preferable that particularly, an ion cleaning processing is performed since excellent surface can be obtained.

Moreover, as a method of forming a reflection prevention film, a method in which the above-described inorganic powder particle is vapor deposited by utilizing dry-plating method such as vacuum vapor deposition, spattering, ion plating and the like is capable of being used.

At least the formation of a high refractive index layer is performed by vapor depositing by utilizing an ion beam assist method. For the other films, needless to say, the ion beam assist method may be used, or the other physical vapor deposition method may be used.

It should be noted that for "ion cleaning" and "ion beam assist", these have been described in detail in Japanese Unexamined Patent Publication Nos. Hei 10-123301 and Hei 11-174205 gazettes and the like.

F. The fundamental constitution of a composition for an organic glass dyeing includes a non-aqueous dye, a size agent (dye supporting resin) and dye resolving agent.

It should be noted that in the following description, an organic glass base material which is to be an object to be dyed or an organic glass base material having a hard coat layer is referred to as "the object base material to be dyed".

The reason why a non-aqueous dye is used is that a material whose sublimation tendency is high is easily obtained as well as its dyeing property (migration to organic glass) to an organic glass having a high refractive index is excellent.

Where the level of sublimation tendency is not necessarily a level indicating a sublimation tendency at the ordinary temperature/under the atmospheric pressure, but may be a level indicating a sublimation tendency in the presence of heating atmosphere and/or in vacuo.

As a non-aqueous dye, a disperse dye for universal use or a solvent dye can be preferably used.

As a disperse dye, "Sumikaron" (made by Sumitomo, Chemical, Co., Ltd.); "Diacelliton", "Dianix", "Samaron" (made by Mitubishi Chemical Ind.-Heochest, Co., Ltd.); "Kayalon Polyester" (mad by Nippon Kayaku, Co., Ltd.); "Miketon Polyester" (made by Mitsui Chemical, Co., Ltd.) and the like, which are commercially available in these trade names, respectively, can be listed.

As a solvent dye, "Spilit" (made by Sumitomo Chemical, Co., Ltd.); "Orient Oil" (made by Orient Chemical, Co., Ltd.), "Mitsui PS" (made by Mitsui Chemical, Co., Ltd.) and the like, which are commercially available in these trade names, respectively, can be listed.

An ultraviolet ray absorbent and a fluorescent whitening agent (which is a kind of water insoluble dyes, respectively) exhibiting the sublimation tendency comparable to these dyes can be added to the disperse dyes and the solvent dyes which are the water insoluble dyes described above.

The content of the above-described ultraviolet ray absorbent and fluorescent whitening agent is made as being in the range of 0.1–50 wt %, and desirably 1–20 wt % of the total amount of weight of the water insoluble dyes to which these absorbent and agent have been added.

In the case where a composition for dyeing containing these ultraviolet ray absorbent and fluorescent whitening agent is applied to a lens of the glasses which is to be formed by an organic glass, these functions can be conferred at the same time that it is dyed. Specifically, when the glasses are used, the fashionability of the glasses can be enhanced as well as the eyes can be protected from ultraviolet rays.

As to an ultraviolet ray absorbent, there are no particular limitations if it has the sublimation tendency, therefore, benzophenone based, benzotriazole based, cyanoacrylate based, salicylate based ultraviolet ray absorbents and the like are capable of being used.

As a fluorescent whitening agent, diaminostilbenedisulfonic acid based, imidazole based, coumalin based, triazole based fluorescent whitening agents and the like are capable of being used.

As a sizing agent (pasting agent: dye carrying and supporting agent), from the viewpoints of the dye carrying and supporting property to a dye and the adhesiveness to a base material having a high refractive index, acrylic resins are used.

The blending ratio of the relevant sizing agent (acrylic resin) to the above-described dye (containing ultraviolet absorbent, fluorescent whitening agent) is made in the range of the sizing agent/dye=60/40–5/95, desirably 40/60–10/90. If the sizing agent is too little, the dye does not easily adhere to the base material, conversely, if it is too much, the dyeing property is lowered and it takes a time to dye (migration).

Concretely, a single or more than two species appropriately selected from the resin ingredients exemplified below can be used.

Now, as an acrylic resin, it is desirable to use a resin whose glass transition temperature (Tg) is in the range of 80–120° C., desirably 100–110° C. average molecular weight (Mn) is in the range of 100,000–200,000, desirably 50,000–150,000. The acrylic resin in these ranges are desirable since it is excellent for solubility and dye supporting property to the dye resolving agent to be described later, and the adhesion property and clearance ratio to the base material.

As a resin ingredient, acrylic resins such as methylpolyacrylic acid, ethylpolyacrylic acid, propylpolyacrylic acid, n-butylpolyacrylic acid, poly (methyl-α-cyanoacrylate), poly (methyl-α-chloroacrylate) and the like; and, methacrylic resins such as methylpolymethacrylic acid, ethylpolymethacrylic acid, n-propylpolymethacrylic acid, n-butyl polymethacrylic acid, t-butylpolymethacrylic acid, n-hexylpolymethacrylic acid, 2-ethylhexylpolymethacrylic acid, laurylpolymethacrylic acid, i-bornyl polymethacrylic acid, stearyl polymethacrylic acid, ethoxyethyl polymethacrylic acid and like can be listed.

As the above-described resolving agent, an organic solvent whose solubility parameter (SP) value is in the range of 8–11, desirably 9–10 is used. In the case where the SP value is out of the range described above, since the mutual solubility of the resin, the dye and the solvent is lowered, the dyeing to the concentration to be aimed at cannot be achieved and it leads to the poor appearances such as non-uniformity or the like.

The dye resolving agent described above is selected considering the fact that the resolving agent does not influence on the surface of the organic glass base material and/or hard coat layer (no dry spot on the surface).

Concretely, a single or more than two species appropriately selected from the organic solvents listed below can be used (SP value is indicated in parenthesis).

Aromatic hydrocarbons such as benzene (9.15), toluene (8.90), o-xylene (9.00), m-xylene (8.80), p-xylene (8.75), ethylbenzene (8.80), naphthalene (9.90), tetralin (9.50), n-propylbenzene (8.65), i-propylbenzene (8.86), mesitylene (8.80), p-cemene (8.85) and the like; and, Ketones such as acetone (10.00), methylethylketone (9.30), diethylketone (8.8), dibutylketone (8.1), methyl-n-propylketone (8.7), methyl-n-butylketone(8.6), methyl-i-amylketone (8.50), methylhexylketone (8.45), cyclohexanone (9.90), acetophenone (9.68) and the like; and, ethers such as methylal (8.52), furan (9.09), β-β-dichloroethylether (9.80), dioxane (10.00), tetrahydrofuran (9.90), ethylcellosolve (9.90) and the like are listed.

Since the organic solvent containing at least ethers and/or ketones, these are excellent in resolving property of water insoluble dye, and does not easily cause the surface of the object base material to be dyed (organic glass or hard coat layer) to be dry spot, these are desirable.

Furthermore, since these solvents make the dye having the sublimation tendency dispersed or resolved stabilize it in the paint and enhance the smoothness as a paint, a silicone based surfactant or fluorine based surfactant can be also blended.

Upon manufacturing a composition for dyeing by blending the above-described raw materials, the concentration of the dye in the composition of the dyeing is made as being in the range of 0.01–50 wt %, desirably 0.1–40 wt %. If the concentration of the dye is too high, the solubility, disperse property is lowered, the dye not capable of being resolved and dispersed is transcribed to the lens as it is, and it leads to the poor appearance. Moreover, conversely, if the concentration is too low, the dyeing can be scarcely carried out.

The concentration of the sizing agent in the composition for dyeing is made as being in the range of 0.01–40 wt %, desirably 0.1–20 wt %. If the concentration of the sizing agent is too low, a sufficient film adhesion thickness for migrating the dye is not easily obtained, and conversely, if it is too high, the profile irregularity (leveling property) is lowered, and it causes the occurrence of the non-uniformity of dyeing.

Then, the dyeing of the object base material to be dyed of the present invention is carried out by forming an adhesive film by coating the above-described paint for dyeing on the object base material to be dyed (pasting is performed), by sublimating the dye and by transferring (migrating) the dye to the object base material to be dyed.

As a method of adhering (coating) the paint for dyeing on the object base material, there are no limitations if it can be uniformly adhered. Concretely, the known technologies, such as a spin coat method, a dipping method, a brushing method, a spraying method, an inkjet recording method and the like can be utilized. At this time, the film thickness of adhesion is, in the case of dry film thickness, usually made as being in the range of 0.3–2 μm, desirably in the range of 0.5–1 μm.

The sublimation of the above-described dyes usually is performed by heating processing, since the heating processing is higher than processing in vacuum.

Moreover, the temperature of the heating processing is usually made as being in the range of about 60–200° C., desirably about 90–170° C., and further desirably about 100–150° C., depending on the glass transition temperature of the organic glass which is to be the object base material to be dyed, the heat resistance temperature of the silicone based hardening coating film or the sublimation pressure (sublimation temperature) of the dye having the sublimation property in the paint for dye sublimation pressure (sublimation temperature).

If the heating processing temperature is too low, the sufficient dyeing property is not easily obtained, and conversely, the thermal deformation of the organic glass is likely to be occurred. It should be noted that in this case, if the atmosphere of the pressure is reduced (usually, 10–800 hPa), the heating processing temperature can be lowered, and the time taken for the processing can be expected to be shortened.

Although the heating processing time is different depending on the difference of the objective coloring concentration and the dyeing property of the object base material, it is usually made as being in the range of 10 minutes to 24 hours, preferably 30 minutes to 6 hours. It is necessary to select both heating processing temperature and time considering the fact that these factors do not have a bad influence on the organic glass base material to be the object to be dyed or the hard coat film (silicone based hardening coating film).

As to this heating processing means, there are no limitations, a circulatory hot stove, a far infrared radiation furnace, an electric furnace, a dry processing using dryer and the like, a wet processing by immersing in hot water or heated oil bath and the like are listed, however, the use of the circulatory hot stove in which there is no unevenness of the temperature within the apparatus and an organic glass can be uniformly heated is desirable.

It should be noted that on this heating processing, if the operation described below is added, a dyed organic glass having the coloring concentration gradation could be easily obtained.

In order to obtain dyed organic glass having the coloring concentration gradation, after the composition for dyeing is coated on the organic glass, non-uniform heating is performed to at least the coating surface.

As a method of performing the non-uniform heating, a far infrared radiation furnace, an electric furnace, a dryer, a hot water bath or heated oil bath in which the local heating is easily performed is used, the heating processing is performed so that the temperature gradation is formed with respect to at least the coated surface, or the heating time is differentiated. By performing such a non-uniform heating, the coloring concentration gradations can be held according to the total heating amount.

Therefore, a far infrared radiation furnace, an electric furnace, a dryer or a wet processing in which the local heating is easily performed is desirable.

As a cooling method when obtaining a dyed glass having the coloring concentration gradation, there are no particular limitations, however, to use the air at less than 40° C. is practically preferable. The cooling by air is capable of suppressing the migration (coloring) due to the thermal conduction.

Since it performs the heating processing at the higher temperature comparing with the conventional immersion dyeing method, it enables to make the dye permeable into the depth of the base material. Moreover, an excellent dyeing effect can be exerted to a base material having an ultra high refractive index that the dyeing is difficult by the conventional immersing dyeing method.

Moreover, when the above-described thermal processing is performed, the prevention for the blowing off the debris to the external and the prevention of scar occurring on the coating formation surface is made as an object, the thermoplastic resin may further be coated on the coating formation surface as a protective film.

As to the above-described thermoplastic resin for protective film, there are no particular limitations if the resin is excellent at heat resistance and the solvent resistance, and after it being a protective film, the resolving and peeling off can be performed. Concretely, polyvinylbutyral, polyvinylalcohol and the like can be preferably used.

The sizing agent and the above-described protective film which is adhered on the base material after the heating processing for the above-described migration (sublimation) are removed by immersing it into an organic solvent, water or the like. As an organic solvent capable of utilizing, an organic solvent having a SP value of 8–11 similarly to the solvent used as the foregoing dye resolving agent is used.

Then, in the case where the above-described method of dyeing is used, each optical element of the present invention is capable of being dyed.

Hereinafter, the respective effects of the present invention will be summed up.

(1) The TPEE based primer composition of the present invention does not lower the heat resistance of the base material as well as the various properties (appearance, scraping and damaging resistance, adhesiveness and shock resistance and the like) comparable to the conventional TPU based primer.

Furthermore, if a metal oxide particle is used in combination, the correspondence to the base material having a higher refractive index can be realized.

(2) A hard coat composition of the present invention is capable of suppressing the optical interference in the case of a lens having an ultra high refractive index by making it the constitution described above. In addition, the hard coat composition of the present invention does neither generate the blackening phenomenon due to the ultraviolet ray, nor, in the case where the optical part is used for a long period, does it damage the esthetic appearance.

(3) A composition for dyeing of the present invention enables to perform the coloring at a given concentration widely ranging from low concentration to high concentration by combining the non-aqueous dye, the sizing agent and dye resolving agent in a specific manner, and further a uniform coloring organic glass without unevenness is capable of being provided.

Then, if a method of dyeing of the present invention is used, since the dye is made to be permeable to the base material at the high temperature, color fade-out is slight comparing with the conventional method. Therefore, the present invention can be applied to a base material having an ultra high refractive index, which has been difficult to dye.

EXPERIMENTAL EXAMPLES

Hereinafter, Examples and Comparative Examples for confirming the effects of the present invention will be described. In the following description, "portion(s)" and "%" indicating a blending unit are "weight portion(s)" and "wt %", respectively, if there is no particular notice thereof.

The respective agents and its representative physical properties are described as follows:

Colloidal silica: "methanol silica sol", made by Nissan Chemical, Co., Ltd., solid content concentration 30%, particle diameter 30 nm, methyl alcohol solvent.

Leveling agent: "SILWET L-77", made by Nippon Unica, Co., Ltd., silicone surfactant.

Titanium oxide based complex particle: "Optolake 1130Z (1)", made by Catalysts & Chemicals Ind., Co., Ltd., $ZrO_2/TiO_2=0.02$, $SiO_2/TiO_2=0.22$, particle diameter 10 nm, solid content concentration 20%, methyl alcohol solvent, surface refining agent γ-glycidoxypropyltrimethoxysilane.

Titanium oxide based complex particle: "Optolake 1130Z (1)", made by Catalysts & Chemicals Ind., Co., Ltd., $SiO_2/TiO_2=0.2049$, $ZrO_2/TiO_2=0.0198$, $K_2O/TiO_2=0.0099$, particle diameter 8 nm, solid content concentration 30%, methyl alcohol solvent, surface refining agent tetraethoxysilane.

Titanium oxide based complex particle: "Optolake 1130Z (2)", made by Catalysts & Chemicals Ind., Co., Ltd., $SiO_2/TiO_2=0.1986$, $ZrO_2/TiO_2=0.0024$, $K_2O/TiO_2=0.0024$, particle diameter 8 nm, solid content concentration 25%, methyl alcohol solvent, surface refining agent tetraethoxysilane.

Leveling agent: "SILWET L-7001", made by Nippon Unica, Co., Ltd., silicone surfactant.

Titanium oxide based complex particle: "Optolake 1130FII", made by Catalysts & Chemicals Ind., Co., Ltd., $SiO_2/TiO_2=0.2351$, $Fe_2O_3/TiO_2=0.0075$, particle diameter 11 nm, solid content concentration 30%, surface refining agent tetraethoxysilane.

TPEE: "Pesresin A-160P", made by Takamatsu Oil Fat, Co., Ltd. water disperse emulsion, solid content concentration 27%, viscosity 0.05 Pa·s, coating film surface hardness 40 (Shore hardness D), polyester/polyester type.

Colloidal silica: "Oscar 1122G", made by Catalysts & Chemicals Ind., Co., Ltd., surface refining agent γ-glycidoxypropyltrimethoxysilane.

Polyurethane: "Superflex 150", made by Dai-ichi-Kogyo Seiyaku, Co., Ltd., solid content concentration 30%, inorganic modified, ester/ether type.

Acrylic resin: "Dianar BR-80", made by Mitsubishi Rayon, Co., Ltd. ,Tg(glass transition temperature): 105° C., Mn: about 95000.

Disperse dye: "Sumikaron Blue-E-RPD", Sumitomo Chemical, Co., Ltd.

Disperse dye: "Sumikaron Red-E-RPD", Sumitomo Chemical, Co., Ltd.

Disperse dye: "Sumikaron Yellow-E-RPD", Sumitomo Chemical, Co., Ltd.

Ultraviolet absorbent: "Ubinar D-50", made by BASF Japan, Co., Ltd., benzophenone based absorbent.

Surfactant: "Revenol V-700", made by Kao Inc., hydrocarbon based surfactant.

Ion cleaning conditions:
Applied voltage: 200V
Charged current: 100 mA
Processing time: 90 seconds
Ion assist conditions:
Applied voltage: 600 V
Charged current: 200 mA

EXAMPLE 1

(1) Plastic Lens

Thiourethane based plastic lens having the refractive index of 1.67 (commercially available)

(2) Hard Coat Processing 171 portions of γ-glycidoxypropyltrimethoxysilane, 28 portions of tetraethoxysilane, and 100 portions of methyl alcohol were added and 70 portions of 0.01 N hydrochloric acid are dropped while agitating, and further, agitating for a night and a day, and the hydrolysate was prepared.

405 portions of the afore-described titanium oxide based complex particle "Optolake 1130Z (1)", and 70 portions of 2-ethoxyethanol were added, and further, as a catalyst, 3 portions of aluminum (III) acetylacetone and 0.3 portion of the leveling agent "SILWET L-7001" was added to the relevant hydrolysate, agitated for a night and a day, and the hard coating composition was prepared.

Next, the plastic lens obtained in the foregoing (1) was immersed in sodium hydroxide aqueous solution (concentration 10%) at the temperature of 40° C., was washed with pure water, after the draining was performed, was immersed in the composition of the foregoing hard coat composition. The lens was drawn up at the rate of 130 mm/min., then, after pre-hardening at 95° C. for 20 minutes, the hardening was performed at 110° C. for 4 hours, and the hard coat film was formed.

(3) Reflection prevention processing

The lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$; refractive index, 1.46; optical film thickness, 26 nm;

The second layer, $TiO_2$; refractive index, 2.37; optical film thickness, 34 nm;

The third layer, $SiO_2$; refractive index, 1.46; optical film thickness, 44 nm;

The fourth layer, $TiO_2$; refractive index, 2.37; optical film thickness, 116 nm;

The fifth layer, $SiO_2$; refractive index, 1.46; optical film thickness, 20 nm;

The sixth layer, $TiO_2$; refractive index, 2.37; optical film thickness, 94 nm; and The seventh layer, $SiO_2$; refractive index, 1.46; optical film thickness, 135 nm; were vapor deposited in the above order. Moreover, the oxygen ion assist vapor deposition was performed to Ti $O_2$ of the second layer, the fourth layer and the sixth layer.

EXAMPLE 2

The present Example was carried out similarly to Example 1 except for that the composition of the hard coating was modified.

As to the hard coating composition, 100 portions of methyl alcohol was added to 205 portions of γ-glycidoxypropiltrimethoxy silane and 45 portions of 0.01N hydrochloric acid were dropped while agitating, and further agitating for a night and a day, and the hydrolysate was prepared.

405 portions of the afore-described titanium oxide based complex particle "Optolake 1130Z (1)", 70 portions of diacetone alcohol were added, and further, as acatalyst, 3 portions of iron (III) acetylacetone and 0.1 portion of the leveling agent "SILWET L-7001" was added, agitated for a night and a day, and the hard coating composition was prepared.

EXAMPLE 3

(1) Plastic Lens

A thioepoxy based plastic lens having the refractive index of 1.74 was obtained.

(2) Hard Coat Processing 136 portions of γ-glycidoxypropyltrimethoxysLlane, 10 portions of tetraethoxysilane, and 60 portions of methyl alcohol were added and 47 portions of 0.01N hydrochloric acid were dropped while agitating, and further, agitating for a night and a day, and the hydrolysate was prepared.

570 portions of the titanium oxide based complex particle "Optolake 1130Z (2)", and 69 portions of 2-ethoxyethanol were added, and as a catalyst, 2.2 portions of aluminium (III) acetylacetone and 0.3 portion of the leveling agent "SILWET L-7001" were added to the relevant hydrolysate, agitating for a night and a day, and the hard coating composition was prepared.

Next, the plastic lens obtained in the foregoing (1) was immersed in sodium hydroxide aqueous solution (concentration 10%) at the temperature of 40° C., was washed with pure water, after the draining was performed, the plasma processing (oxygen gas, flow rate 40 cc/min., output 100W, processing time 40 seconds) was performed, immersed in the composition of the foregoing hard coat composition. The lens was drawn up at the rate of 130 mm/min., then, after pre-hardening at 95° C. for 20 minutes, the hardening was performed at 110° C. for 4 hours, and the hard coat film was formed.

(3) Reflection Prevention Processing

The lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$; refractive index, 1.46: optical film thickness, 26 nm;

The second layer, $ZrO_2$; refractive index, 2.05; optical film thickness, 58 nm;

The third layer, $SiO_2$; refractive index, 1.46: optical film thickness, 38 nm;

The fourth layer, $TiO_2$; refractive index, 2.37; optical film thickness, 236 nm;

The fifth layer, $ZrO_2$; refractive index, 2.05; optical film thickness, 49 nm; and The sixth layer, $SiO_2$; refractive index, 1.46; optical film thickness, 118 nm, were vapor deposited in the above order. Moreover, the oxygen ion assist vapor deposition was performed to Ti $O_2$ of the fourth layer.

EXAMPLE 4

The present Example was carried out similarly to Example 3except for that the composition of the hard coating and the configuration of the reflection prevention film were modified.

As to the hard coating composition, 60 portions of methyl alcohol was added to 149 portions of γ-glycidoxypropyltrimethoxysilane, 40 portions of 0.01N hydrochloric acid were dropped while agitating, and further agitating for a night and a day, and the hydrolysate was prepared.

570 portions of the afore-described titanium oxide based complex particle "Optolake 1130Z (2)", 69 portions of diacetone alcohol were added, and further, as a catalyst, 3 portions of iron (III) acetylacetone and 0.3 portion of the leveling agent "SILWET L-7001" was added to the relevant hydrolysate, agitated for a night and a day, and the hard coating composition was prepared.

As to the reflection prevention film, the lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$; refractive index, 1.46; optical film thickness, 26 nm;

The second layer, $TiO_2$; refractive index, 2.37; optical film thickness, 40 nm;

The third layer, $SiO_2$; refractive index, 1.46; optical film thickness, 46 nm;

The fourth layer, $TiO_2$; refractive index, 2.37; optical film thickness, 121 nm;

The fifth layer, $SiO_2$; refractive index, 1.46; optical film thickness, 21 nm;

The sixth layer, $TiO_2$; refractive index, 2.37; optical film thickness, 90 nm; and The seventh layer, $SiO_2$; refractive index, 1.46; optical film thickness, 137 nm; were vapor deposited in the above order. Moreover, the oxygen ion assist vapor deposition was performed to $TiO_2$ of the second layer, the fourth layer and the sixth layer. The obtained spectral reflection factor property is shown in FIG. 1.

COMPARATIVE EXAMPLE 1

The present Comparative Example was carried out similarly to Example 1 except for that the composition of the hard coating was modified.

As to the hard coating composition, 182 portions of γ-glycidoxypropyltrimethoxysilane, 60 portions of tetraethoxysilane, 280portions of methyl alcohol was added to the relevant hydrolysate, 47 portions of 0.01N hydrochloric acid were dropped while agitating, and further agitating for a night and a day, and the hydrolysate was prepared.

460 portions of the afore-described titanium oxide based complex particle "Optolake 1130 F II", as a catalyst, 20 portions of itaconic acid, 6 portions of dicyanamide and 0.3 portion of the leveling agent "SILWET L-7001" was added, agitated for a night and a day, and the hard coating composition was prepared.

COMPARATIVE EXAMPLE 2

The present Comparative Example was carried out similarly to Example 2 except for that the reflection prevention film was modified.

As to the reflection prevention film, the lens was set in the lens dome for rotating the lens to which the hard coat film is provided, while the vacuum chamber was heated at 60° C. exhausted up to the pressure $1.33 \times 10^{-3}$ Pa ($1 \times 10^{-5}$ torr), and after oxygen ion cleaning was performed, from the substrate side, The first layer, $SiO_2$; refractive index, 1.46; optical film thickness, 26 nm;

The second layer, $TiO_2$; refractive index, 2.25; optical film thickness, 34 nm;

The third layer, $SiO_2$; refractive index, 1.46; optical film thickness, 48 nm;

The fourth layer, $TiO_2$; refractive index, 2.25; optical film thickness, 268 nm; and, The fifth layer, $SiO_2$; refractive index, 1.46; optical film thickness, 127 nm, were vapor deposited in the above order.

COMPARATIVE EXAMPLE 3

The present Comparative Example was carried out similarly to Example 3 except for that the composition of the hard coating was modified.

As to the hard coating composition, 182 portions of γ-glycidoxypropyltrimethoxysilane, 60 portions of tetraethoxysilane, 150 portions of methyl alcohol was added, 47 portions of 0.01N hydrochloric acid were dropped while agitating, and further agitating for a night and a day, and the hydrolysate was prepared.

610 portions of the titanium oxide based complex particle "Optolake 1130 F II", as a catalyst, 20 portions of itaconic acid, 6 portions of dicyanamide and 0.3 portion of the leveling agent "SILWET L-7001" was added to the relevant hydrolysate, agitated for a night and a day, and the hard coating composition was prepared.

COMPARATIVE EXAMPLE 4

The present Comparative Example was carried out similarly to Example 4 except for that the reflection prevention film was modified.

Figure 2:
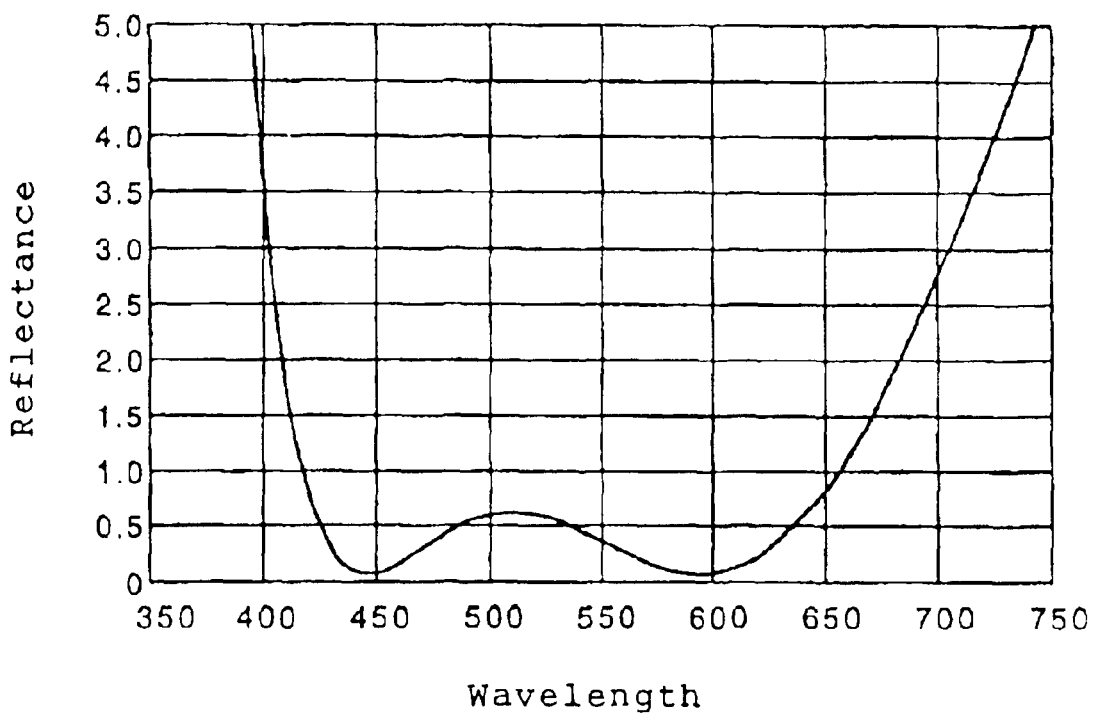
FIG. 2 is a graphical representation showing the relationship between wavelength and reflectivity of lens prepared in comparative Example 4.

As to the reflection prevention film, the lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$: refractive index, 1.46; optical film thickness, 26 nm;

The second layer, $TiO_2$; refractive index, 2.37; optical film thickness, 33 nm;

The third layer, $SiO_2$; refractive index, 1.46; optical film thickness, 47 nm;

The fourth layer, $TiO_2$; refractive index, 2.37; optical film thickness, 265 nm; and, The fifth layer, $SiO_2$; refractive index, 1.46; optical film thickness, 125 nm, were in turn vapor deposited. Moreover, the oxygen ion assist vapor deposition was performed to $TiO_2$ of the second layer and the fourth layer. The obtained spectral reflection factor property is shown in FIG. 2.

EXAMPLE 5

(1) Preparation of Plastic Lens 3 portions of diisopropylperoxycarbonate which is the polymerization initiation agent was mixed with 100 portions of diethyleneglycol bis (arylcarbonate), filtered with 0.8 μmembrane filter, and the filtrate was injected into the glass-made template. Next, the filtrate was heated at 40° C. for 3 hours, raised from 40° C. to 65° C. for 12 hours, from 65° C. to 85° C. for 6 hours, and after finally heated at 85° C. for 3 hours, the lens was taken out from the template, and further the annealing (distortion removal) was carried out at 130° C. for 2 hours, and the plastic lens having the refractive index of 1.5 was obtained.

(2) Primer processing 105 portions of colloidal silica "Oscar 1122G", as a dilution solvent 350 portions of methylalcohol, as a leveling agent one portion of "SILWET L-77" were mixed with 100 portions of TPEE "Pesresin A-160P" commercially available, agitated until it became in a uniformed state, then this was made as a primer paint.

Next, the plastic lens obtained in the foregoing (1) was immersed in sodium hydroxide aqueous solution (concentration 10%) at the temperature of 40° C., was washed with pure water, after the draining was performed, immersed in the composition of the foregoing primer paint. The lens was drawn up at the rate of 160 mm/min., the hardening was carried out under the conditions of being at 110° C. for 20 minutes.

(3) Hard Coat Processing 97 portions of methyl alcohol was added to 109 portions of γ-glycidoxypropyltrimethoxysilane, 40 portions of tetraethoxysilane, 27 portions of γ-glycidoxypropyl-methyldimethoxysilane, and 38 portions of 0.01 N hydrochloric acid were dropped while agitating, and further, agitating for a night and a day and the hydrolysate was prepared.

390 portions of the colloidal silica "Methanol silica sol", 290 portions of pure water were added, and as a catalyst, 1.5 portions of iron acetylacetone and 3.0 portions of the leveling agent "SILWET L-77" were added to the relevant hydrolysate, agitating for a night and a day, and the hard coating composition was prepared.

Next, after the primer processed lens processed in the foregoing (2) was immersed in the foregoing hard coating composition, the lens was drawn up at the rate of 105 mm/min., then, after undergoing pre-hardening at 95° C. for 20 minutes, the hardening was performed at 100° C. for 2 hours, and the hard coat film was formed.

(4) Reflection Prevention Processing

The lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$; refractive index, 1.46; optical film thickness, 26 nm;

The second layer, $ZrO_2$; refractive index, 2.05; optical film thickness, 70 nm;

The third layer, $SiO_2$; refractive index, 1.46; optical film thickness, 27 nm;

The fourth layer, $ZrO_2$; refractive index, 2.05; optical film thickness, 135 nm; and, The fifth layer, $SiO_2$; refractive index, 1.46; optical film thickness, 135 nm, were in turn vapor deposited.

EXAMPLE 6

(1) Plastic Lens

A thiourethane based plastic lens having the refractive index of 1.60.

(2) Primer Processing

The present Example was carried out similarly to Example 5, except for that 105 portions of colloidal silica was changed to 57 portions of the titanium oxide based complex particle "Optolake 1120Z (S-7, G)", and the amount of addition of portions of methyl alcohol was changed to 646 portions.

(3) Hard Coat Processing 90 portions of methyl alcohol was added to 182 portions of γ-glycidoxypropyltrimethoxysilane, 65 portions of tetraethoxysilane, and 52 portions of 0.01 N hydrochloric acid were dropped while agitating, and further, agitating for a night and a day, and the hydrolysate was prepared.

250 portions of the titanium oxide complex particle "Optolake 1130 F II", 70 portions of pure water were added, and as a catalyst, 1.5 portions of iron acetylacetone and 3.0 portions of the leveling agent "SILWET L-77" were added to the relevant hydrolysate, agitating for a night and a day, and the hard coating composition was prepared.

Next, after the primer processed lens processed in the foregoing (2) was immersed in the foregoing hard coating composition, the lens was drawn up at the rate of 105 mm/min., then, after undergoing pre-hardening at 95° C. for 20 minutes, the hardening was performed at 100° C. for 2 hours, and the hard coat film was formed.

(4) Reflection Prevention Processing

The lens was set in the lens dome for rotating the lens to which the hard coat film is provided, while the vacuum chamber was heated at 60° C., exhausted up to the pressure $1.33 \times 10^{-3}$ Pa ($1 \times 10^{-5}$ torr), and after oxygen ion cleaning was performed, from the substrate side, The first layer, $SiO_2$: refractive index, 1.46; optical film thickness, 26 nm;

The second layer, $ZrO_2$; refractive index, 2.05; optical film thickness, 83 nm;

The third layer, $SiO_2$; refractive index, 1.46; optical film thickness, 21 nm;

The fourth layer, $ZrO_2$; refractive index, 2.05; optical film thickness, 135 nm; and, The fifth layer, $SiO_2$; refractive index, 1.46; optical film thickness, 135 nm, were in turn vapor deposited.

EXAMPLE 7

The present Example was carried out similarly to Example 1 except for that the primer processing was provided.

(1) Primer Processing

The processing was carried out similarly to Example 6 except for that the titanium oxide based complex particle was changed. The titanium oxide based complex particle was changed to 85 portions of "Optolake 1130Z (1)".

EXAMPLE 8

The present Example was carried out similarly to Example 3 except for that the primer processing was provided.

(1) Primer Processing

The processing was carried out similarly to Example 7 except for that the amount of addition of the titanium oxide based complex particle was changed to 180 portions, methyl alcohol which is the diluent was changed to 350 portions.

COMPARATIVE EXAMPLE 5

The present Example was carried out similarly to Example 5 except for that the primer paint was modified.

105 portions of colloidal silica "Oscar 1122G", as a diluent 350 portions of methylalcohol, as a leveling agent, one portion of "SILWET L-77" were mixed with 100 portions of aqueous emulsion polyurethane "Super Flex 150" commercially available, agitated until it became in a uniformed state, then this was made as a primer paint.

COMPARATIVE EXAMPLE 6

The present Example was carried out similarly to Example 6 except for that the primer paint was modified.

The primer paint was prepared similarly to Comparative Example 5 except for that 105 portions of colloidal silica was changed to 82.5 portions of the titanium oxide based complex particle "Optolake 1120Z (S-7, G)", and the amount of addition of methylalcohol, which is the diluent, was changed to 640 portions.

COMPARATIVE EXAMPLE 7

The present Example was carried out similarly to Example 7 except for that the primer paint was modified.

The primer paint was prepared similarly to Comparative Example 6 except for that the titanium oxide based complex particle was modified. The titanium oxide based complex particle was changed to 125 portions of "Optolake 1130Z (1)".

COMPARATIVE EXAMPLE 8

The present Example was carried out similarly to Example 8 except for that the primer paint was modified.

The primer paint was prepared similarly to Comparative Example 7 except for that the amount of addition of the titanium oxide based complex particle was changed to 203 portions, the amount of addition of methyl alcohol was changed to 350 portions.

EXAMPLE 9

(1) Plastic Lens

The plastic lens manufactured similarly to Example 5.

(2) Preparation of Composition of Dye

After 3.2 portions of acrylic resin "Dianar BR-80" commercially available was resolved in 12.8 portions of toluene, 12 portions of methylethylketones, 12 portions of dioxane, as a leveling agent, 0.01 portion of "SILWET L-7001" were mixed, agitated until it became in a uniform state and the composition was prepared.

6 portions of the blue disperse dye "Sumikaron Blue-E-RPD", 4 portions of the red disperse dye "Sumikaron Red-E-RPD", 2 portions of the yellow disperse dye "Sumikaron Yellow-E-RPD" were added to the relevant composition, after agitating for 60 min., the filtration was carried out with 3 $\mu$filter, and the composition for dye was prepared.

(3) Preparation of Paint for Protective Film

Next, 85 portions of pure water was added to 15 portions of polyvinyl alcohol (degree of polymerization, about 2,000), agitated until it became in a uniform state, and the paint for protective film was prepared.

(4) Preparation of Dyed Lens

Next, the lens was wiped up with a cloth immersed in ethyl alcohol, the foregoing composition for dyeing was coated on the convex surface of the relevant lens by the spin coat method (Step 1:300 rpm×15 sec., Step 2:1,000 rpm×15 sec.), after air drying, under the same conditions, the paint for protective film was coated.

After this lens was heated at 130° C. for 30 minutes in an air-oven, immersed in water for 1 minute, then, immersed in acetone for 1 minute, and the dyed lens was obtained.

(5) Hard Coat Processing

Furthermore, this lens was immersed in sodium hydroxide aqueous solution (concentration 10) at the temperature of 40° C., was washed with pure water, after the draining was performed, was immersed in the hard coat composition used in Example 5. The lens was drawn up at the rate of 105 mm/min., then, after pre-hardening at 95° C. for 20 minutes was obtained, then, the hardening was performed at 110° C. for 2 hours, and the dyed lens hard coat processed product was obtained.

EXAMPLE 10

(1) Preparation of Plastic Lens

The thiourethane based plastic lens which is the same with that of Example 1 (commercially available product)

(2) Preparation of Composition for Dyeing

The composition for dyeing was prepared similarly to Example 9.

(3) Preparation of Paint for Protective Film

The paint for protective film was prepared similarly to Example 9.

(4) Preparation of Dyed Lens

The dyed lens was manufactured similarly to Example 9.

(5) Hard Coat Processing The hard coat processing was carried out similarly to the hard coat processing in Example 1.

EXAMPLE 11

(1) Preparation of Plastic Lens

The plastic lens which is the same with that of Example 3.

(2) Preparation of Composition for Dyeing

The composition for dyeing was prepared similarly to Example 9.

(3) Preparation of Paint for Protective Film

The paint for protective film was prepared similarly to Example 9.

(4) Preparation of Dyed Lens

The dyed lens was manufactured similarly to Example 9 except for that the heating processing conditions in the air-oven was changed. The heating processing conditions in the air-oven was changed to the conditions of 130° C.×60 min.

(5) Hard Coat Processing

The hard coat processing was carried out similarly to the hard coat processing in Example 3.

EXAMPLE 12

(1) Preparation of Plastic Lens

The plastic lens manufactured similarly to Example 5.

(2) Hard Coat Processing

Next, this lens was immersed in sodium hydroxide aqueous solution (concentration 10%) at the temperature of 40° C., was washed with pure water, after the draining was performed, was immersed in the composition of the hard coat composition used in Example 5. The lens was drawn up at the rate of 105 mm/min., then, after undergoing the pre-hardening at 95° C. for 20 minutes, the hardening was performed at $_{100}$° C. for 2 hours, and the hard coat processing was carried out.

(3) Preparation of Composition for Dyeing

The composition for dyeing was prepared similarly to Example 9.

(4) Preparation of Paint for Protective Film

The paint for protective film was prepared similarly to Example 9.

(5) Dying of Hard Coat Processing Lens Next, the lens was wiped up with a cloth immersed in ethyl alcohol, the foregoing composition for dyeing was coated on the convex surface of the relevant lens by the spin coat method (Step 1: 300 rpm×15 sec., Step 2: 1,000 rpm×15 sec.), after air drying, under the same conditions, the paint for protective film was coated.

After this lens was heated at 130° C. for 30 minutes in an air-oven, immersed in water for 1 minute, then, immersed in acetone for 1 minute, and the dyed lens was obtained.

EXAMPLE 13

(1) Preparation of Plastic Lens The plastic lens which is the same with that of Example 5.

(2) Preparation of Composition of Dye

After 3.84 portions of acrylic resin "Dianar BR-80" commercially available was resolved in 15.36 portions of toluene, 14.4 portions of methylethylketones, 14.39 portions of dioxane, as a leveling agent, 0.01 portion of "SILWET L-7001" were mixed, agitated until it became in a uniform state and the composition was prepared.

2 portions of the ultraviolet ray absorbent "Ubinar D-50". (the other water insoluble dye is not contained) was added to the relevant composition, after agitating for 60 min., the filtration was carried out with 3 filter, and the composition for dye was prepared.

(3) Preparation of Paint for Protective Film

The paint for protective film was prepared similarly to Example 9.

(4) Preparation of Dyed Lens

The dyed lens was manufactured similarly to Example 9.

(5) Hard Coat Processing

The hard coat processing was carried out similarly to the hard coat processing in Example 9.

EXAMPLE 14

(1) Preparation of Plastic Lens

The plastic lens which is the same with that of Example 1.

(2) Preparation of Composition for Dyeing

The composition for dyeing was prepared similarly to Example 9.

(3) Preparation of Paint for Protective Film

The paint for protective film was prepared similarly to Example 9.

(4) Preparation of Concentration Gradation (half) Dyed Lens

Next, the lens was wiped up with a cloth immersed in ethyl alcohol, the foregoing composition for dyeing was coated on the convex surface of the relevant lens by the spin coat method (Step 1: 300 rpm×15 sec., Step 2: 1,000 rpm×15 sec.), and after air drying, under the same conditions, the paint for protective film was coated.

This lens was fixed, the hot air was blown on the convex surface of the lens by the heating gun from about 10cm upward of the surface. At this time, the heating gun was shifted downward while the heating gun was vibrated up and down, and further, the air at room temperature (23° C.) was hit to the portions on which the hot air have not been hit. This operation was repeated for 3 minutes. (surface maximum temperature, 180° C.).

Next, this lens was immersed in water for 1 minute, then, immersed in acetone for 1 minute, and the dyed lens with concentration gradation was obtained. For this concentration gradation lens, the portion which has been located below at the time when the lens was fixed was colored as the thickest portion and as going upward, the coloring became thinner.

(5) Hard Coat Processing

The hard coat processing was carried out similarly to the hard coat processing in Example 1.

EXAMPLE 15

(1) Preparation of Plastic Lens

The plastic lens which is the same with that of Example 3.

(2) Preparation of Composition for Dyeing

The composition for dyeing was prepared similarly to Example 9.

(3) Preparation of Paint for Protective Film

The paint for protective film was prepared similarly to Example 9.

(4) Preparation of Concentration Gradation (half) Dyed Lens

The preparation was carried out similarly to Example 14 except for that the heating time was changed to 5minutes.

(5) Hard Coat Processing

The hard coat processing was carried out similarly to the hard coat processing in Example 3.

COMPARATIVE EXAMPLE 9

(1) Preparation of Plastic Lens

The plastic lens which is the same with that of Example 5.

(2) Preparation of Composition for Dyeing 2 portions of "Sumikaron Blue-E-RPD", 1 portion of "Sumikaron Red-E-RPD", 1 portion of "Sumikaron Yellow-E-RPD", and as a surfactant, 3 portions of "Rhevenol V-700" were added to 1,000 portions of water, and after agitating, heated up to 90° C. and the composition for dyeing was prepared.

(3) Preparation of Dyed Lens

Next, the lens was wiped up with a cloth immersed in ethyl alcohol, immersed in the foregoing composition for dyeing for 30 minutes, and the dyed lens was obtained.

(4) Hard Coat Processing

The hard coat processing was carried out similarly to the hard coat processing in Example 9.

COMPARATIVE EXAMPLE 10

(1) Preparation of Plastic Lens

The plastic lens was prepared similarly to Example 1.

(2) Preparation of Composition for Dyeing

The composition for dyeing was prepared similarly to Comparative Example 9.

(3) Preparation of Dyed Lens

The preparation of dyed lens was carried out similarly to Comparative Example 3.

(4) Hard Coat Processing

The hard coat processing was carried out similarly to the hard coat processing in Example 1.

COMPARATIVE EXAMPLE 11

(1) Preparation of Plastic Lens

The plastic lens was prepared similarly to Example 3.

(2) Preparation of Composition for Dyeing

The composition for dyeing was prepared similarly to Comparative Example 9.

(3) Preparation of Dyed Lens

The preparation of dyed lens was carried out similarly to Comparative Example 9 except for that the immersion time in the composition for dyeing was changed. The immersion time was changed to 120 minutes.

(4) Hard Coat Processing

The hard coat processing was carried out similarly to the hard coat processing in Example 3.

COMPARATIVE EXAMPLE 12

(1) Preparation of Plastic Lens

The plastic lens was prepared similarly to Example 5.

(2) Hard Coat Processing

The hard coat processing was carried out similarly to Example 12.

(3) Preparation of Composition for Dyeing

The composition for dyeing was prepared similarly to Comparative Example 9.

(4) Preparation of Dyed Lens

Next, the hard coat processed lens was wiped up with a cloth immersed in ethyl alcohol, then, immersed in the foregoing composition for dyeing for 30 minutes, and the dyed lens was obtained.

COMPARATIVE EXAMPLE 13

(1) Preparation of Plastic Lens

The plastic lens was prepared similarly to Example 5.

(2) Preparation of Composition for Dyeing 2 portions of the ultraviolet ray absorbent "Ubinar D-50" and as a surfactant, 3 portions of "Rhevenol V-700" were added to 1,000 portions of water, and after agitating, heated up to 90° C. and the composition for dyeing was prepared.

(3) Preparation of Dyed Lens

The preparation of dyed lens was carried out similarly to Comparative Example 10.

(4) Hard Coat Processing

The hard coat processing was carried out similarly to the hard coat processing in Example 9.

COMPARATIVE EXAMPLE 14

(1) Preparation of Plastic Lens

The plastic lens which is the same plastic lens with that of Example 1.

(2) Preparation of Composition for Dyeing

The composition for dyeing was prepared similarly to Comparative Example 9.

(3) Preparation of Dyed Lens

Next, the lens was wiped up with a cloth immersed in ethyl alcohol, then, immersed in the foregoing composition for dyeing for 10 minutes using the half dyeing apparatus (Nikon half dyeing apparatus, made by Nikon Corporation), and the dyed lens was obtained.

(4) Hard Coat Processing

The hard coat processing was carried out similarly to the hard coat processing in Example 1.

COMPARATIVE EXAMPLE 15

(1) Preparation of Plastic Lens

The plastic lens which is the same plastic lens with that of Example 3.

(2) Preparation of Composition for Dyeing

The composition for dyeing was prepared similarly to Comparative Example 9.

(3) Preparation of Dyed Lens

The preparation of dyed lens was carried out similarly to Comparative Example 14 except for that the immersion time in the composition for dyeing was changed. The immersion time was changed to 60 minutes.

<Evaluation Items>

(1) Interference Fringes

The light of fluorescent lamp "trade name: Mellow 5N" (made by Toshiba Lighting & Technology Corporation, three band neutral white fluorescent lamp) was reflected on the surface of test piece, and determined by the degree of its optical interference color (rainbow pattern) formed on the surface of the object.

(2) Adhesiveness 100 pieces of squares were formed on the test piece at 1 mm intervals in 1 cm square, after the cellophane-made adhesive tape was strongly pressed on it, rapidly peeled off in the 90 degrees direction, repeated 10 times, and the number of squares which have not peeled off was counted.

(3) Scraping and Damaging Resistance

The load of (0.6 kgf) was added on the steel-wool (#0000), the surface of each test piece was scraped 30 times/15 sec., and determined depending on the degree of damage.

3A: the area of damage was 0%,

2A: the area of damage exceeded over 1%, less than 2%,

A: the area of damage exceeded over 3%, less than 10%,

AB; the area of damage exceeded over 10%, less than 30%,

B: the area of damage exceeded over 30%, less than 60%,

C: the area of damage was more than 60%, and

D: the area of damage was the whole area.

(4) Hot Water Resistance

The test piece was immersed in a hot water at 80° C. for 10 minutes, its appearance (the presence or absence of crack) and adhesiveness test (described above) were carried out.

(5) Heat Resistance

Each test piece was heated for 5 minutes using "Perfect Oven" (trade name: made by Tabai Espec, Corp.), and after leaving at room temperature for 30 minutes, determined with the presence or absence of crack.

The temperature started from 60° C., raised the temperature at intervals of 10° C., the highest temperature that the crack was not recognized was made the heat resistance temperature.

(6) Weatherability

Exposed to the accelerated weathering test ("Sunshine Super Long Life Weather Strip meter", made by Suga Test Instruments) for 200 hours, the appearance (surface state) and adhesiveness test (described above) was carried out.

(7) Measurements of Reflection Prevention Area and Spectral Luminous Efficacy

Using reflectometry ("USP-II", made by Olympus Optical, Co., Ltd.), the measurements were carried out.

(8) Measurement of Spectral Luminous Transmittance

Using the spectral luminous transmissonmeter ("STS-2", made by Fuji Koden, Co., Ltd.), measurement was carried out.

(9) Measurement of Spectral Luminous Transmittance After Ultraviolet Ray Irradiation The measurement of spectral luminous transmittance (described above) was carried out after the mercury lamp for discoloration test ("H400-F", Toshiba Lighting & Technology, Corp.) was emitted and the test piece was exposed to the lamp at the distance of about 20 cm for 50 hours.

(10) Shock Resistance

Steel ball (33 g) was dropped from the height of 127 cm on the center portion of the test piece, determined depending on whether it was cracked or not.

(11) 400 nm Transmittance

Using spectrophotometer ("UV-1200", made by Shimazu, Corp.), transmittance of 400 nm was measured.

TABLE 1

|  | Lens | Hard film | Reflection prevention film |
|---|---|---|---|
| Example 1 | 1.67 | Metal particle(1) Hardening agent: aluminum acetylacetone | Ion cleaning: done Assist deposition: done Equivalent film configuration: medium, high refractive index |
| Example 2 | 1.67 | Metal particle(1) Hardening agent: iron acetylacetone | Same as Example 1 |
| Example 3 | 1.74 | Metal particle(2) Hardening agent: aluminum acetylacetone | Ion cleaning: done Assist deposition: done Equivalent film configuration: medium, high refractive index |
| Example 4 | 1.74 | Metal particle(2) Hardening agent: iron acetylacetone | Ion cleaning: done Assist deposition: done Equivalent film configuration: medium, high refractive index |
| Comparative Example 1 | 1.67 | Metal particle(3) Hardening agent: itaconic acid and dicyandiamide | Same as Example 1 |
| Comparative Example 2 | 1.67 | Same as Example 2 | Ion cleaning: done Assist deposition: none Equivalent film configuration: medium refractive index |
| Comparative Example 3 | 1.74 | Metal particle(3) Hardening agent: itaconic acid and dicyandiamide | Same as Example 3 |
| Comparative Example 4 | 1.74 | Same as Example 4 | Ion cleaning: done Assist deposition: none Equivalent film configuration: medium refractive index |

Metal particle (1) "Optolake 1130Z (1)"
Metal particle (2) "Optolake 1130Z (2)"
Metal particle (3) "Optolake 1130F II"

TABLE 2

|  | Lens | Primer | Hard film | Reflection prevention film |
|---|---|---|---|---|
| Example 5 | 1.50 | Polyester based TPE | Colloidal silica Hardening agent: iron acetylacetone | Ion cleaning: done Assist deposit: none Equivalent film configuration: High refractive index |
| Example 6 | 1.60 | Polyester based TPE | Metal particle(3) Hardening agent: iron acetylacetone | Ion cleaning: done Assist deposit: none Equivalent film configuration: High refractive index |
| Example 7 | 1.67 | Polyester based TPE | Same as Example 1 | |
| Example 8 | 1.74 | Polyester based TPE | Same as Example 3 | |
| Comparative Example 5 | 1.50 | Poly-urethane Based TPU | Same as Example 5 | |
| Comparative Example 6 | 1.60 | Poly-urethane Based TPU | Same as Example 6 | |
| Comparative Example 7 | 1.67 | Poly-urethane Based TPU | Same as Example 7 (Same as Example 1) | |
| Comparative Example 8 | 1.74 | Poly-urethane Based TPU | Same as Example 8 (Same as Example 3) | |

Metal particle (3): "Optolake 1130 F II"

TABLE 3

|  | Lens | Dyeing | Hard film |
|---|---|---|---|
| Example 9 | 1.50 | Sublimation type dyeing | Same as Example 5 |
| Example 10 | 1.67 | Sublimation type dyeing | Same as Example 1 |
| Example 11 | 1.74 | Sublimation type dyeing | Same as Example 3 |
| Example 12 | 1.50 | Sublimation type dyeing Coloring after hard film formation | Same as Example 5 |
| Example 13 | 1.50 | Sublimation type dyeing Ultraviolet ray absorbent | Same as Example 5 |
| Example 14 | 1.67 | Sublimation type dyeing With concentration gradation | Same as Example 1 |
| Example 15 | 1.74 | Sublimation type dyeing With concentration gradation | Same as Example 3 |
| Comparative Example 9 | 1.50 | Dip dyeing method | Same as Example 9 |
| Comparative Example 10 | 1.67 | Dip dyeing method | Same as Example 10 |
| Comparative Example 11 | 1.74 | Dip dyeing method | Same as Example 11 |
| Comparative Example 12 | 1.50 | Dip dyeing method Coloring after hard film formation | Same as Example 12 |
| Comparative Example 13 | 1.50 | Dip dyeing method Ultraviolet ray absorbent | Same as Example 13 |
| Comparative Example 14 | 1.67 | Dip dyeing method With concentration gradation | Same as Example 14 |
| Comparative Example 15 | 1.74 | Dip dyeing method With concentration gradation | Same as Example 15 |

TABLE 4

| Test piece No. | 1 | 2 | 3 | 4 | 5 | 6 |
|---|---|---|---|---|---|---|
| Test piece | Example 5 | Example 6 | Example 7 | Example 8 | Comparative Example 5 | Comparative Example 6 |
| Interference fringes | excellent | excellent | excellent | excellent | excellent | excellent |
| Adhesiveness | 100/100 | 100/100 | 100/100 | 100/100 | 100/100 | 100/100 |
| Scraping and damaging resistance | A | AB | A | A | A | AB |
| Hot water resistance, appearance | excellent | excellent | excellent | excellent | excellent | excellent |
| Hot water resistance, adhesiveness | 100/100 | 100/100 | 100/100 | 100/100 | 100/100 | 100/100 |
| Heat resistance | 70° C. | 90° C. | 90° C. | 100° C. | 60° C. | 80° C. |
| Shock resistance | Not cracked | Not cracked | Not Cracked | Not Cracked | Not Cracked | Not Cracked |

| Test piece No. | 7 | 8 | 9 | 10 | 11 | 12 |
|---|---|---|---|---|---|---|
| Test piece | Comparative Example 7 | Comparative Example 8 | Example 5: Primer film none | Example 6: Primer film none | Example 7: Primer film none (Example 1) | Example 8: Primer film none (Example 3) |
| Interference fringes | excellent | excellent | excellent | excellent | excellent | excellent |
| Adhesiveness | 100/100 | 100/100 | 100/100 | 100/100 | 100/100 | 100/100 |
| Scraping and damaging resistance | A | A | A | AB | A | A |
| Hot water resistance, appearance | excellent | excellent | excellent | excellent | excellent | excellent |
| Hot water resistance, adhesiveness | 100/100 | 100/100 | 100/100 | 100/100 | 100/100 | 100/100 |
| Heat resistance | 80° C. | 90° C. | 70° C. | 90° C. | 90° C. | 100° C. |
| Shock resistance | Not cracked | Not cracked | Cracked | Cracked | Cracked | Cracked |

Comparative Example 1 is inferior at scraping and damaging resistance in the hard coat, and the lowering of spectral luminous transmittance of the reflection prevention processed product due to ultraviolet ray irradiation is significant. It is considered that this is caused by the titanium oxide complex particle contained in the hard coat.

Comparative Example 2 is low at scraping and damaging resistance and heat resistance of the reflection prevention processed product. This is due to the difference of the film-forming conditions of the reflection prevention film.

For comparative Example 3, interference fringes are slightly recognized, and the spectral luminous transmittance due to ultraviolet ray irradiation of the reflection prevention processed product is significant similar to Comparative Example 1.

Comparative Example 4 is excellent at durability, however, the reflection prevention band in the visible light area was narrower comparing with Example (see FIG. 1 and FIG. 2).

Examples 1–4 were excellent in all the items.

TABLE 5

| | Example 1 | Example 2 | Example 3 | Example 4 | Comparative Example 1 | Comparative Example 2 | Comparative Example 3 | Comparative Example 4 |
|---|---|---|---|---|---|---|---|---|
| HD | | | | | | | | |
| Interference Fringes | Excellent | Excellent | Excellent | Excellent | Excellent | Excellent | Some | Excellent |
| Adhesiveness | 100/100 | 100/100 | 100/100 | 100/100 | 100/100 | 100/100 | 100/100 | 100/100 |
| Scraping and damaging resistance | A - AB | A - AB | A - AB | A - AB | AB | A - AB | A - AB | A - AB |
| Hot water resistance: appearance | Excellent | Excellent | Excellent | Excellent | Excellent | Excellent | Excellent | Excellent |
| Hot water resistance: adhesiveness | 100/100 | 100/100 | 100/100 | 100/100 | 100/100 | 100/100 | 100/100 | 100/100 |

TABLE 5-continued

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| HD + AR |  |  |  |  |  |  |  |  |
| Interference Fringes | Excellent | Excellent | Excellent | Excellent | Excellent | Excellent | Some | Excellent |
| Adhesiveness | 100/100 | 100/100 | 100/100 | 100/100 | 100/100 | 100/100 | 100/100 | 100/100 |
| Scraping and damaging resistance | A | A | A | A | AB | AB | A | A |
| Hot water resistance: appearance | Excellent | Excellent | Excellent | Excellent | Excellent | Excellent | Excellent | Excellent |
| Hot water resistance: adhesiveness | 100/100 | 100/100 | 100/100 | 100/100 | 100/100 | 100/100 | 100/100 | 100/100 |
| Heat resistance | 90° C. | 90° C. | 100° C. | 100° C. | 90° C. | 80° C. | 100° C. | 100° C. |
| Weatherability: Appearance | Excellent | Excellent | Excellent | Excellent | Excellent | Excellent | Excellent | Excellent |
| Weatherability: Adhesiveness | 100/100 | 100/100 | 100/100 | 100/100 | 100/100 | 100/100 | 100/100 | 100/100 |
| Reflection prevention area | Wide area | Wide area | Wide area | Wide area | Wide area | Wide area | Wide area | Rather Wide area |
| Spectral luminous reflectance | 0.35% | 0.35% | 0.34% | 0.35% | 0.35% | 0.32% | 0.32% | 0.35% |
| Spectral luminous transmittance | 99.0% | 99.0% | 98.7% | 98.6% | 99.0% | 99.1% | 98.6% | 98.6% |
| Spectral luminous transmittance after ultraviolet ray irradiation | 97.8% | 97.8% | 97.3% | 97.6% | 94.8% | 97.9% | 93.3% | 97.4% |

The test pieces Nos. 1–4 using the TPEE based primer of Examples 5–8 have heat resistance comparable to the primer non-coated test pieces Nos. 9–12 as well as are excellent at appearance similar to the test pieces Nos. 5–8 using the TPU based primer of Comparative Examples 5–8 corresponding to these, and at adhesiveness, scraping and damaging resistance, hot water resistance and shock resistance. Specifically, the test pieces Nos. 1–4 are excellent at heat resistance comparing with the test pieces Nos. 5–8 using the TPU based primer of Comparative Examples 5–8.

Examples 9–15 by sublimation tendency dyeing can be colored in a short time up to a high concentration and the fastness after the processing (HD) are also excellent comparing with the corresponding Comparative Examples 9–15 by the conventional dyeing.

What is claimed is:

1. An optical element comprising a primer layer between an organic glass base material and a silicone based hardening coating film, said primer layer comprising: a primer layer formation polymer; wherein the primer layer formation polymer is a polyester based thermoplastic elastomer, also known as ester based TPE.

2. A primer composition that forms all or part of a primer layer between an organic glass base material and a silicone based hardening coating film comprising: a primer layer formation polymer; wherein the primer layer formation polymer is an ester based TPE, and the primer layer further

TABLE 6

|  | Example 9 | Example 10 | Example 11 | Example 12 | Example 13 | Example 14 | Example 15 |
|---|---|---|---|---|---|---|---|
| Dyeing processing time Coloring concentration | 30 min. | 30 min. | 60 min. | 30 min. | 30 min. | 3 min. | 5 min. |
| Spectral luminous transmittance | 8.5% | 15.2% | 58.2% | 23.1% | — | 6.1% | 28.3% |
| 400 nm transmittance | — | — | — | — | 15.8% | — | — |
| Spectral luminous transmittance after HD | 9.7% | 15.9% | 58.7% | — | 16.2% | 6.4% | 28.6% |

|  | Comparative Example 9 | Comparative Example 10 | Comparative Example 11 | Comparative Example 12 | Comparative Example 13 | Comparative Example 14 | Comparative Example 15 |
|---|---|---|---|---|---|---|---|
| Dyeing processing time Coloring concentration | 30 min. | 30 min. | 120 min. | 30 min. | 30 min. | 10 min. | 60 min. |
| Spectral luminous transmittance | 23.8% | 20.1% | 83.1% | 45.8% | — | 49.4% | 79.7% |
| 400 nm transmittance | — | — | — | — | 52.3% | — | — |
| Spectral luminous transmittance after HD | 28.1% | 26.4% | 83.8% | — | 54.1% | 56.8% | 80.9% | comprises a metal oxide particle; wherein the metal oxide particle is an optical interference control agent.

3. The primer composition as claimed in claim 2, characterized in that weight ratio of hard segment and soft segment of said ester based TPE is the former/the latter= 30/70–90/10, and said ester based TPE indicates surface hardness (Shore hardness D): 35–75, bend elasticity: 40–800 MPa.

4. The primer composition as claimed in claim 1, characterized in that weight ratio of hard segment and soft segment of said ester based TPE is the former/the latter= 30/70–90 /10, and said ester based TPE indicates surface hardness (Shore hardness D): 35–75, bend elasticity: 40–800 MPa.

5. The silicone based hardening coating film of claim 1, wherein a hard coat composition that forms said silicone based hardening coating film is a hard coat composition consisting of hydrolysate of alkoxysilane whose main body is trialkoxysilane containing a monoepoxy organic group as a matrix formation ingredient, and titanium based metal oxide complex particle as an optical interference control agent, and said titanium based metal oxide complex particle is consists of $TiO_2$ as a main ingredient, and $SiO_2$ as a major sub-ingredient, and further, $ZrO_2$ and $K_2O$ as a trace sub-ingredient.

6. The silicon based hardening coating film of claim 5, wherein for said titanium based metal oxide complex particle, average diameter thereof is made as one being in a range of 1–50 nm, composition thereof is made as one satisfying each weight ratio of $SiO_2/TiO_2$=0.1900–0.2100, $ZrO_2/TiO_2$=0.0015–0.023, $K_2O/TiO_2$=0.0012–0.012, content thereof is in a range of 40–100 weight portions to 100 weight portions of whole alkoxysilane content.

7. The silicon based hardening coating film of claim 6, wherein said trialkoxysilane containing said monoepoxy organic group consists of one or more than species selected from the group represented by general formula (1):

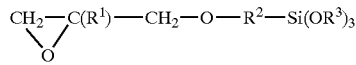

(where $R^1$ represents H or $CH_3$, $R^2$ represents alkylene group having 1–4 of carbon atoms and $R^3$ represents alkyl group having 1–4 of carbon atoms), or represented by general formula (2):

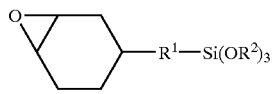

(where $R^1$ represents alkylene group having 1–4 of carbon atoms and $R^2$ represents alkyl group having 1–4 of carbon atoms).

8. The silicon based hardening coating film of claim 7, wherein the hardening composition further contains in addition to said trialkoxysilane containing said monoexpoxy organic group a tetraalkoxysilane represented by general formula (3):

(where $R^1$ represents alkyl group having 1–4 of carbon atoms), the content of the tetraalkoxysilane being 20 wt % or less of the total content of said alkoxysilane.

9. The silicon based hardening coating film of claim 8, wherein said hard coat composition contains an organic metal compound as a hardening agent of the matrix formation ingredient, the relevant organic metal compound consists of one or more species selected from the group of chelate compounds of Cr (III), Co (III), Fe (III), Zn (II), In (III), Zr (IV), Y (III), Sn, V, Al (III), Ti (II) with which chelating agent selected from ethylenediamine-tetraacetic acid, hexafluoroacetylacetone, trifluoroacetylacetone, acetylacetone and methyl acetoacetate coordinates.

10. A method of forming an optical element comprising the steps of:
forming a hard coat layer on a surface of an organic glass base material via a primer layer,
wherein said primer layer comprises a primer layer formation polymer wherein all or part of the primer layer formation polymer is an ester based TPE,
wherein said hard coat layer comprises a hard coat composition, said hard coat composition comprising hydrolysate of alkoxysilane whose main body is trialkoxysilane containing monoepoxy organic group as a matrix formation ingredient, and titanium based metal oxide complex particle as an optical interference control agent, and
wherein said titanium based metal oxide complex particle comprises $TiO_2$ as a main ingredient, $SiO_2$ as a major sub-ingredient and further $ZrO_2$ and $K_2O$ as a trace sub-ingredient.

11. The method of forming an optical element as claimed in claim 10, wherein said primer composition further comprises a metal oxide particle as an optical interference control agent.

12. The method of forming an optical element as claimed in claim 10 or 11, wherein said organic glass base material is obtained by polymerizing and reacting (1) one or more active hydrogen compounds selected from the group consisting of polyols, polythiols and hydroxy compounds having a mercapto group, and (2) one or more compounds selected from the group of polyisothiocyanate compounds or isothiocyanate compounds having an isocyanate group, or a compound obtained by polymerizing and reacting episulfide having cyclic skeleton having two or more equivalents of a structure represented by general formula (4):

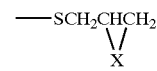

where X represents S or O and the amount of S is 50% or more on average with respect to total of S and O constituting the three membered ring.

13. The method of forming an optical element as claimed in claim 10, further comprising the step of laminating a reflection prevention film layer on said hard coat layer.

14. The method of forming an optical element as claimed in claim 13, wherein said reflection prevention film whose design center wavelength λ is made in a range of 450–550 nm, has a multilayer structure having a medium refractive index layer having an optical film thickness of 0.19–0.29 λ, a high refractive index layer having an optical film thickness of 0.42–0.58 λ, and a low refractive index layer having an optical film thickness of 0.19–0.29 λ are in turn formed.

15. The method of forming an optical element as claimed in claim 14, wherein said medium refractive index layer and said high refractive index layer are comprised of an equivalent film comprising two or more layers having different refractive index substances.

16. A method of forming an optical element as claimed in claim 13, 14 or 15, further comprising the step of film-forming method of a reflection prevention film, wherein ion cleaning processing is performed on said hard coat layer surface prior to the film-forming of a reflection prevention film.

17. The method of forming an optical element as claimed in claim 16, wherein film-forming of at least high refractive index layer out of said reflection prevention films is performed by vapor deposition using an ion beam assist method.

18. A method of forming optical element comprising the steps of:
forming a hard coat layer on an organic glass base material surface via a primer layer and
sublimely dyeing an organic glass base material,
wherein said primer layer comprises a primer layer formation polymer wherein all or part of the primer layer formation polymer is an ester based TPE,
wherein said hard coat layer comprises a hard coat composition, said hard coat composition comprising hydrolysate of alkoxysilane whose main ingredient is trialkoxysilane containing monoepoxy organic group as a matrix formation ingredient, and titanium based metal oxide complex particle as an optical interference control agent,
wherein said titanium based metal oxide metal complex particle comprises $TiO_2$ as a main ingredient, $SiO_2$ as a major sub-ingredient and further $ZrO_2$ and $K_2O$ as a trace sub-ingredient, and
wherein the composition used for said sublimation type dyeing step comprises a an acrylic resin sizing agent, a water insoluble dye, and an organic solvent having 8–11 of a SP value (resolving property parameter) as a dye resolving agent.

19. The method of forming an optical element as claimed in claim 18, wherein said primer composition further contains a metal oxide particle as an optical interference control agent.

20. The method of forming an optical element as claimed in claim 18 or 19, wherein said organic glass base material is obtained by polymerizing and reacting (1) one or more active hydrogen compounds selected from the group of polyols, polythiols, and hydroxy compounds having a mercapto group, and (2) one or more compounds selected from the group of polyisothiocyanate compounds or isothiocyanate compounds having an isocyanate group, or a compound obtained by polymerizing and reacting episulfide compounds having cyclic skeleton having two or more of equivalents of a structure represented by general formula (4):

where X represents S or O and the amount of S is 50% or more on average with respect to total of S and O constituting the three membered ring.

21. A method of using the primer composition of any of claim 1, 2, 3 or 4, whereby the primer layer is placed between said organic glass base material and said silicone based hardening coating film to form an optical element.

* * * * *